US012657774B2

(12) United States Patent
Luo et al.

(10) Patent No.: US 12,657,774 B2
(45) Date of Patent: Jun. 16, 2026

(54) DATA PIPELINE FOR CAMERAS WITH MULTIPLE COLOR CHANNELS

(71) Applicant: Motional AD LLC, Boston, MA (US)

(72) Inventors: Lin Luo, South San Francisco, CA (US); Arthur Safira, Boston, MA (US)

(73) Assignee: MOTIONAL AD LLC, Boston, MA (US)

( * ) Notice: Subject to any disclaimer, the term of this patent is extended or adjusted under 35 U.S.C. 154(b) by 327 days.

(21) Appl. No.: 18/177,551

(22) Filed: Mar. 2, 2023

(65) Prior Publication Data

US 2024/0135589 A1 Apr. 25, 2024

Related U.S. Application Data

(60) Provisional application No. 63/379,619, filed on Oct. 14, 2022.

(51) Int. Cl.
*G06T 9/00* (2006.01)
*G02B 5/20* (2006.01)
*G02F 1/1335* (2006.01)
*G06V 10/75* (2022.01)

(52) U.S. Cl.
CPC ............... *G06T 9/00* (2013.01); *G02B 5/208* (2013.01); *G02F 1/133514* (2013.01); *G06V 10/751* (2022.01)

(58) Field of Classification Search
CPC .................................................. G06V 10/751
See application file for complete search history.

(56) References Cited

U.S. PATENT DOCUMENTS 11,294,062 B2 4/2022 Talbert et al.
2005/0149598 A1 7/2005 Mendlovic et al.
(Continued)

FOREIGN PATENT DOCUMENTS

EP            1769459 B1   11/2014
KR   10-2022-0053790 A    5/2022
KR       20220053790 A  * 5/2022   ............... G06T 9/00

OTHER PUBLICATIONS

U.S. Appl. No. 17/931,051, filed Sep. 9, 2022, Fu et al.
(Continued)

*Primary Examiner* — Miya J Cato

(74) *Attorney, Agent, or Firm* — Knobbe, Martens, Olson & Bear, LLP

(57) ABSTRACT

Provided are methods for processing raw data for sensors with multiple color channels, which can include receiving raw image data associated with an image sensor, wherein the raw image data includes a plurality of groups of pixels including a first group of pixels associated with a first filter and a second group of pixels associated with a second filter. The methods may also include generating, from the raw image data, a plurality of wavelength-based data groups including a first wavelength-based data group and a second wavelength-based data group. The first wavelength-based data group may include first pixels corresponding to the first group of pixels and the second wavelength-based data group may include second pixels corresponding to the second group of pixels. The methods may also include encoding the first wavelength-based data group and the second wavelength-based data group. Systems and computer program products are also provided.

22 Claims, 22 Drawing Sheets

(56)                    References Cited

U.S. PATENT DOCUMENTS

| | | | |
|---|---|---|---|
| 2015/0312503 A1 | 10/2015 | Sato et al. | |
| 2018/0213142 A1 | 7/2018 | Usui et al. | |
| 2018/0277581 A1* | 9/2018 | Kim | H10F 39/8053 |
| 2019/0082185 A1* | 3/2019 | Satavalekar | H04N 1/413 |
| 2019/0293797 A1 | 9/2019 | Heenan et al. | |
| 2021/0383555 A1 | 12/2021 | Shin et al. | |
| 2022/0020180 A1* | 1/2022 | Lee | G06T 9/00 |
| 2022/0020181 A1* | 1/2022 | Lee | G06T 9/00 |
| 2022/0021889 A1* | 1/2022 | Lee | H04N 19/593 |
| 2022/0108466 A1 | 4/2022 | Mendlovic et al. | |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Great Britain Office Action issued for Application No. GB 2305947.0, dated Nov. 7, 2023.

Korean Office Action issued for Application No. KR 10-2023-0056051, dated Apr. 30, 2024.

Great Britain Office Action received for GB Application No. 2500647.9, mailed Apr. 8, 2025.

Korean Office Action received for KR Application No. 10-2023-0056051, mailed May 29, 2025.

Notice of Allowance received for KR Application No. 10-2023-0056051, mailed Dec. 29, 2025.

\* cited by examiner

Figure 4B:
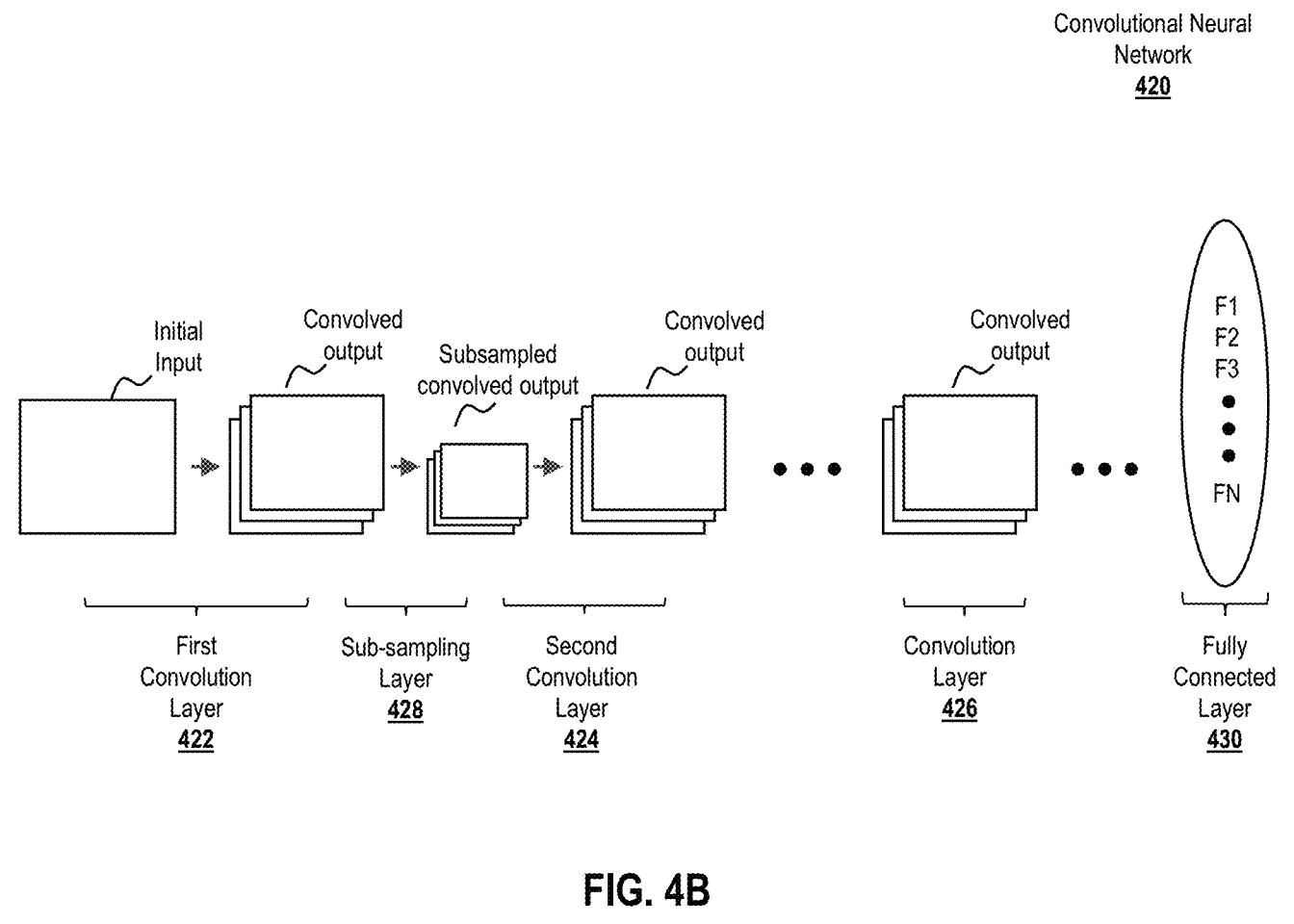

Convolutional Neural Network 420

Initial Input

First Convolution Layer 422

Convolved output

Sub-sampling Layer 428

Subsampled convolved output

Second Convolution Layer 424

Convolved output

Convolution Layer 426

Convolved output

Fully Connected Layer 430

DATA PIPELINE FOR CAMERAS WITH MULTIPLE COLOR CHANNELS

INCORPORATION BY REFERENCE TO ANY PRIORITY APPLICATIONS

This application claims the priority benefit of U.S. Provisional Patent Application No. 63/379,619, entitled DATA PIPELINE OF RAW DATA FOR CAMERAS WITH MULTIPLE INDIVIDUAL COLOR CHANNELS, filed on Oct. 14, 2022, which is incorporated herein by reference in its entirety.

BACKGROUND

Autonomous vehicles may process sensor image data using an image signal processing (ISP) pipeline.

BRIEF DESCRIPTION OF THE FIGURES

FIG. 4B is a diagram of an implementation of a neural network.

DETAILED DESCRIPTION

Figure 1:
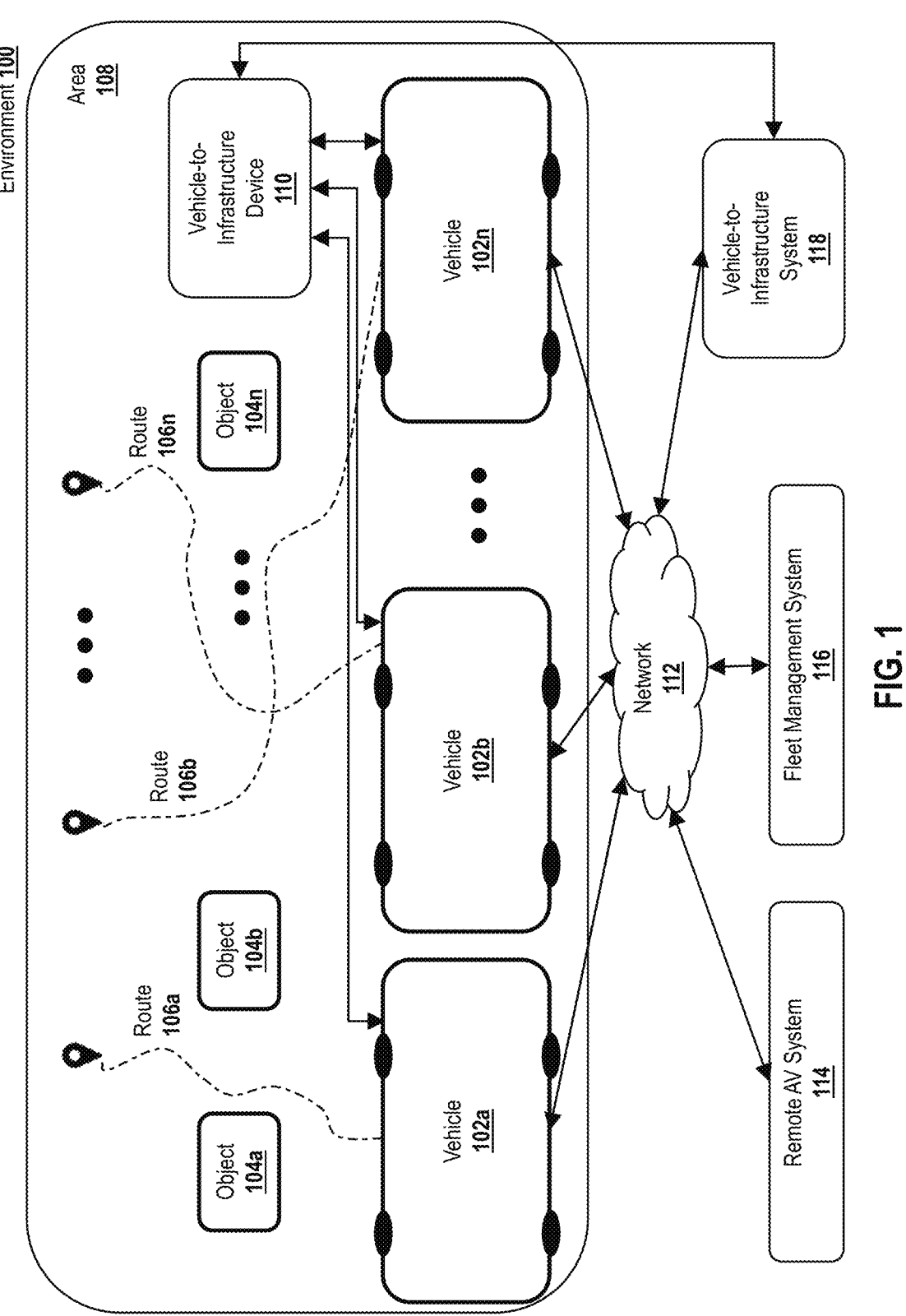
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
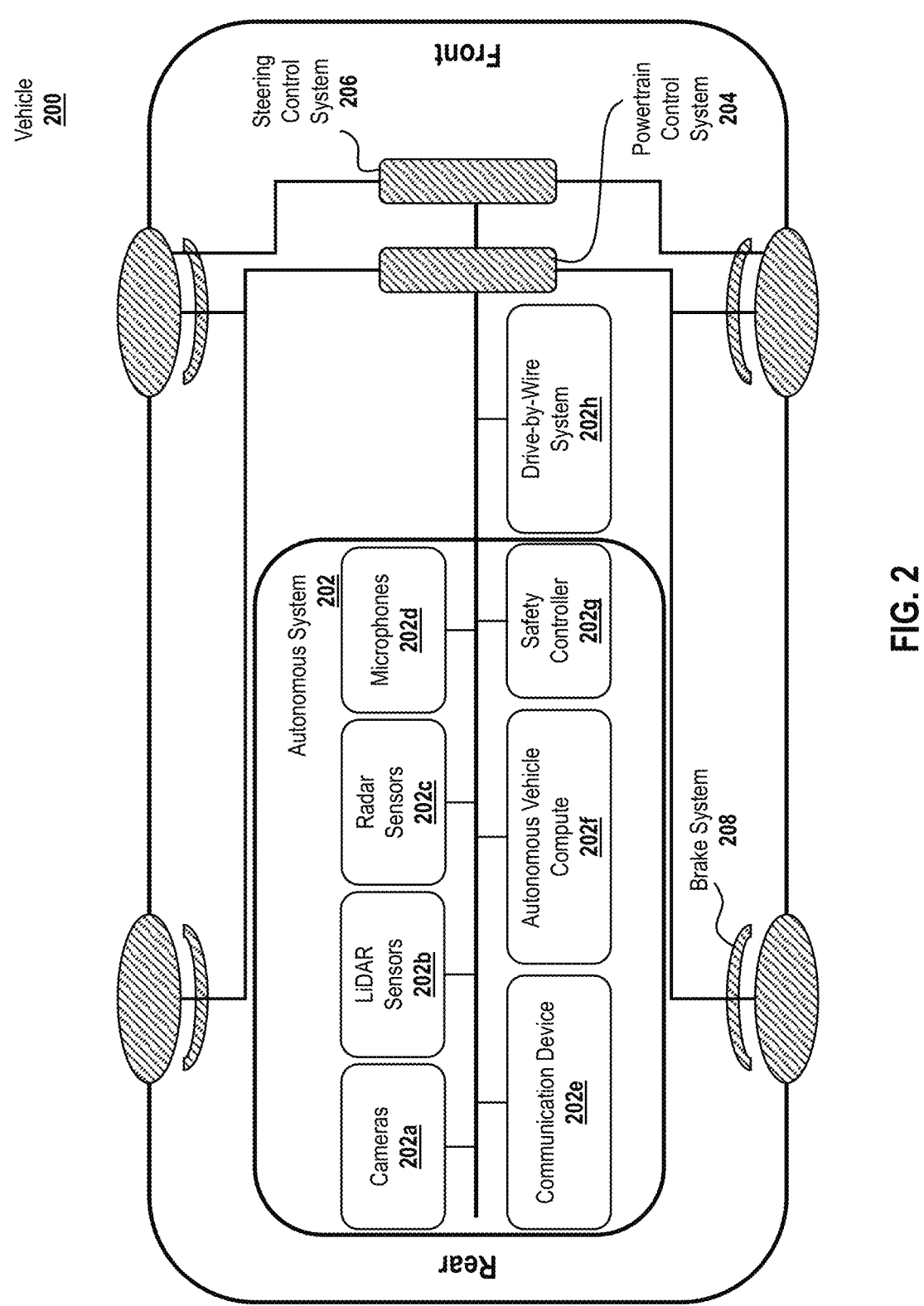
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5

ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
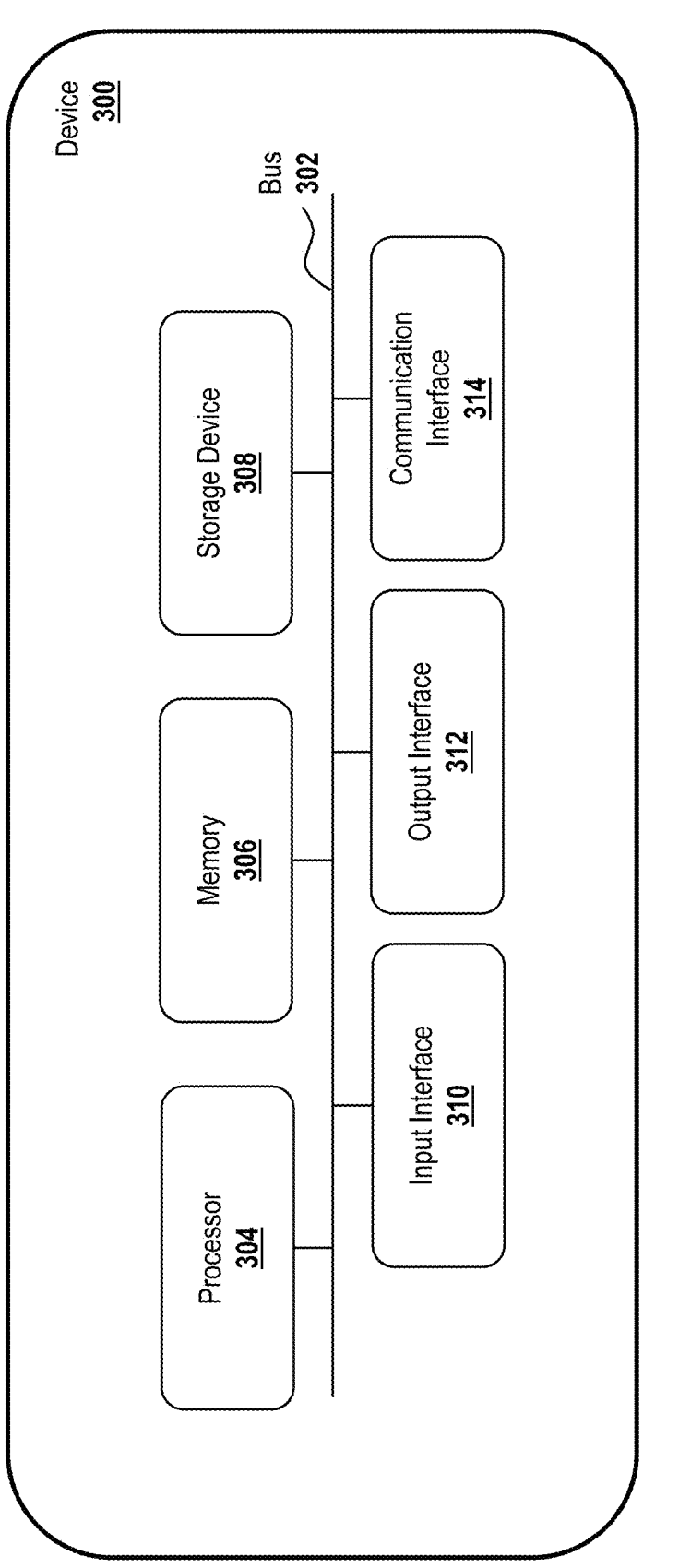
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
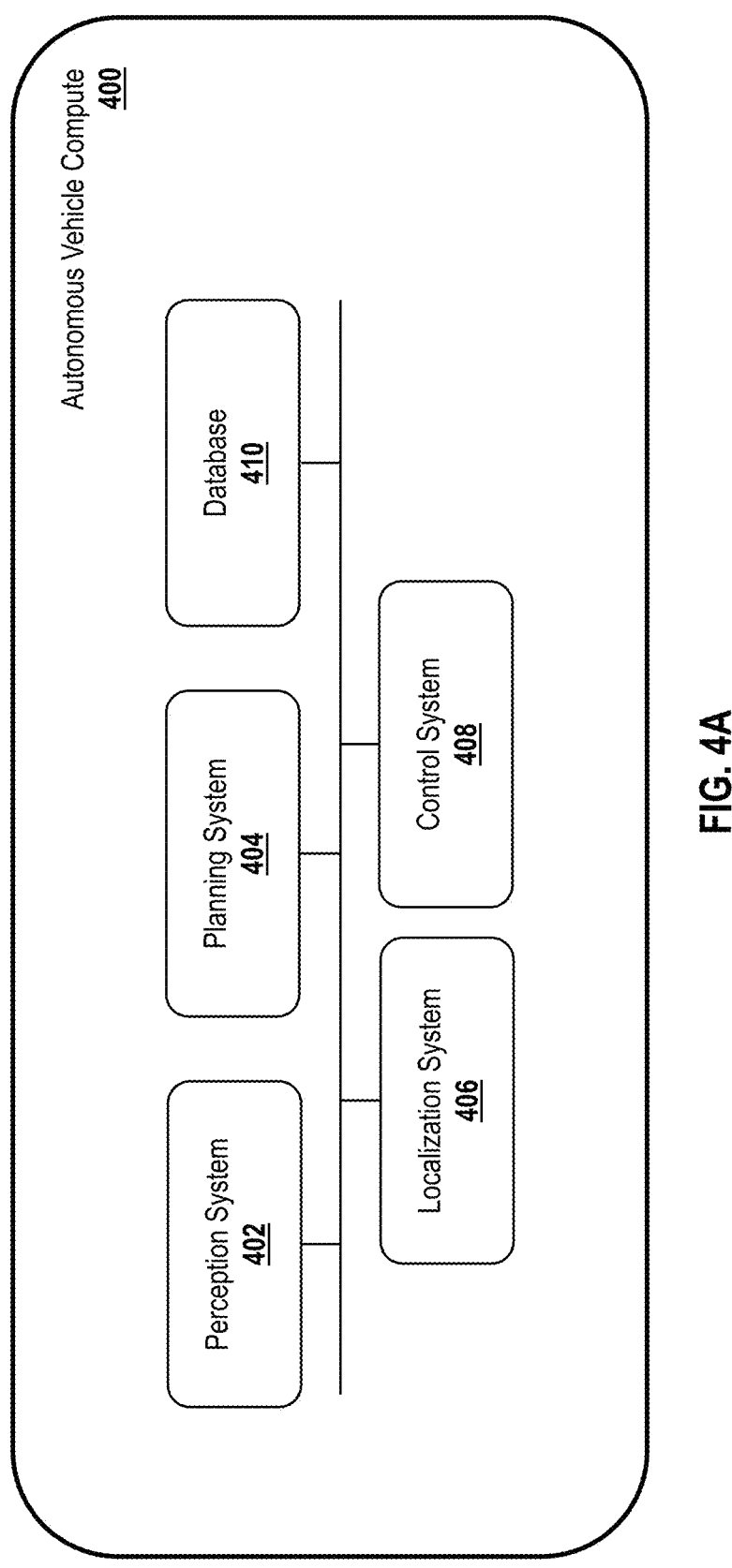
FIG. 4A is a diagram of certain components of an autonomous system.
Figure 4C:
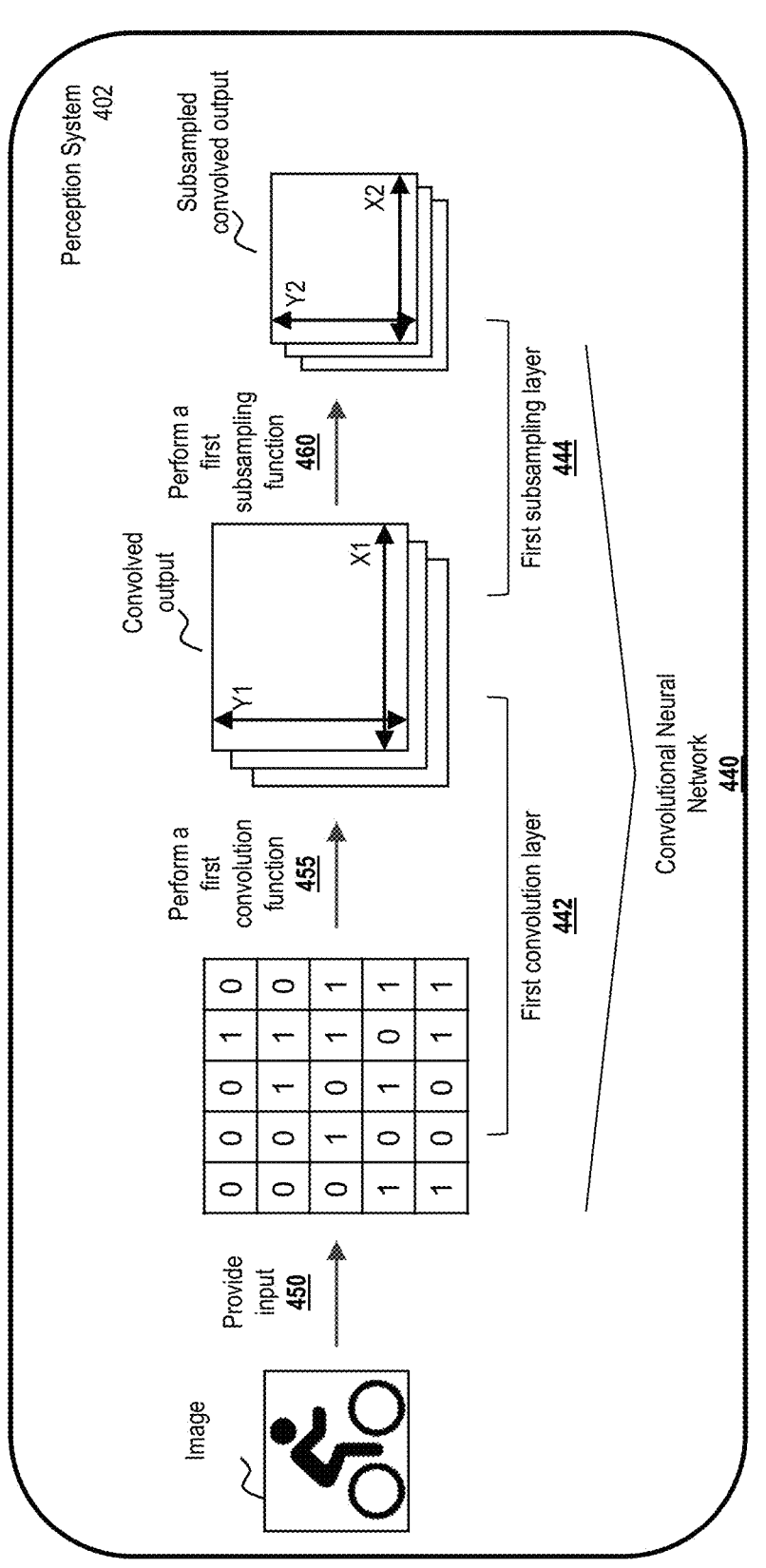
FIGS. 4C and 4D are a diagram illustrating example operation of a CNN.
Figure 4D:
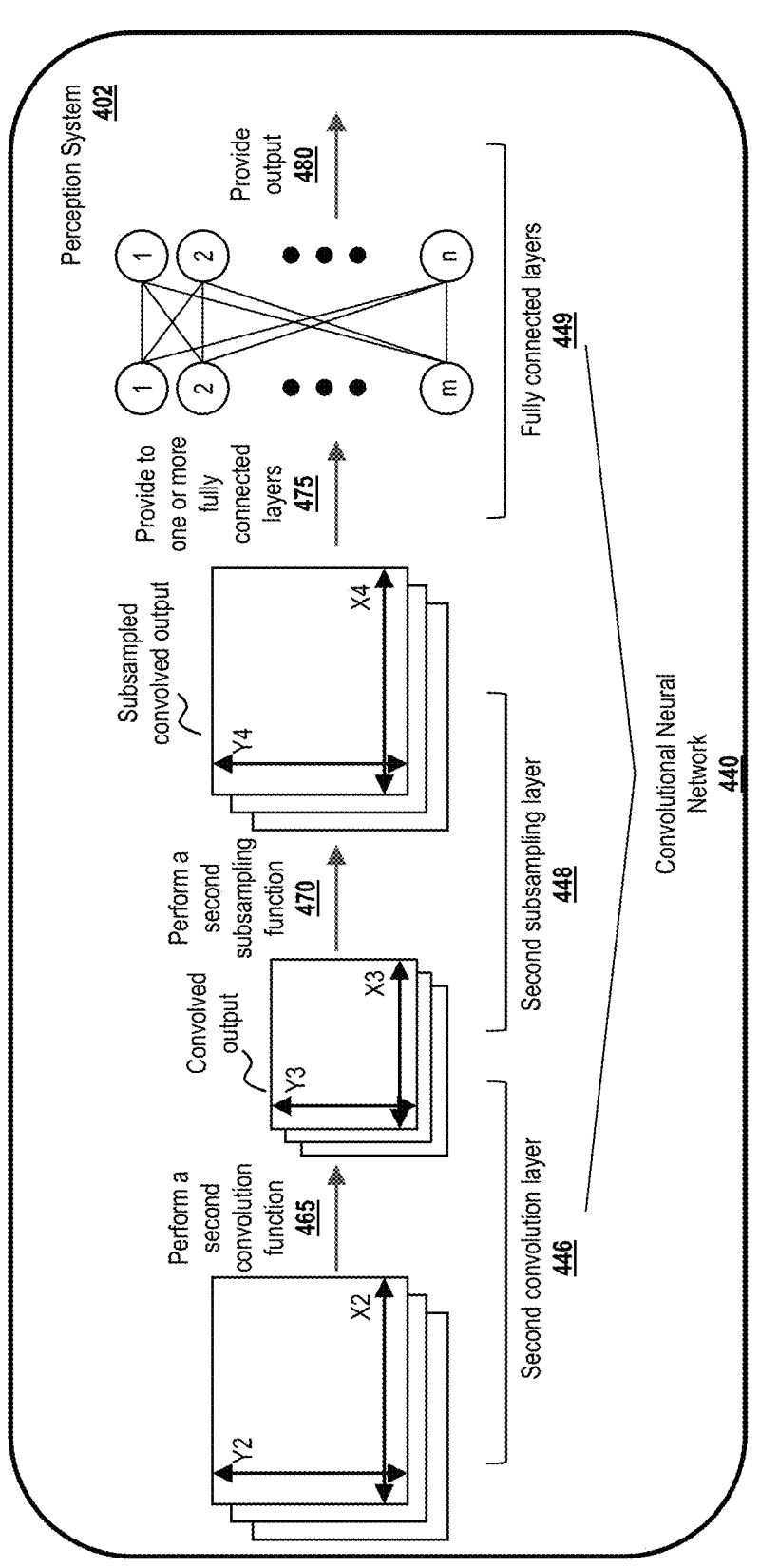

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Overview of Encoding Raw Image Data

In some cases, a camera 202a may generate raw image data using an image sensor and convert the raw image data into wavelength-based image data (also referred to herein as color image data) using an image signal processing (ISP) pipeline.

The wavelength-based image data or color image data may include different wavelength-based or color-based data groups. In certain cases, the data groups may correspond to different wavelengths of light and/or colors. For example, a first data group may correspond to red pixels of the image sensor (or red color detected by the image sensor), a second image data group may correspond to green pixels of the image sensor (or green color detected by the image sensor), and a third image data group may correspond to blue pixels of the image sensor (or blue color detected by the image sensor).

In some cases, the different data groups may be represented as wavelength-based image data arrays or matrices (also referred to herein as color image data arrays/matrices). The different color image data arrays may correspond to different colors or wavelengths of light. For example, a first color image data array may store values corresponding to an amount of red light absorbed at different pixels of the image sensor. In some such cases, each value may correspond to a particular pixel of the image sensor (e.g., with a row/column of the first color image data array corresponding to a pixel in the image sensor). Similarly, other color image data arrays may store values corresponding to an amount of green, blue, or infrared, light, respectively, absorbed at different pixels of the image sensor. In some cases, such as in the case of an RGB image, the camera 202a may generate at least three color image data arrays for red, green, and blue, respectively.

The format, structure, depth, and/or values of the color image data, data groups, or color image data arrays may correspond to the image sensor and/or the camera 202a. For example, the color image generated from one image sensor of a first camera 202a may differ from the color image data (of the same scene) generated by another image sensor (with the same specifications, such as filters, pixel number, pixel size, etc.) of another camera 202a based on the image sensor (e.g., manufacturer, version, lot number, etc.) or other hardware of the cameras 202a. Accordingly, in some cases, the color image data may also be referred to as device-specific color image data or device image data. An example of device image data may be an RGB image that includes a red image matrix that includes values representing red detected by pixels of the image sensor, one or more green image matrices that include values representing green detected by pixels of the image sensor, and a blue image matrix that includes values representing blue detected by pixels of the image sensor.

The camera 202a may use the color image data to generate an image or standardized image data according to a standardized color space (e.g., standard RGB, Adobe RGB, Natural Color System (NCS)). The camera 202a may encode the standardized image data, transfer the standardized image data (or encoded version) to other elements of the autonomous vehicle compute 400 (e.g., the perception system 402, planning system 404, localization system 406, control system 408, and/or database 410), and/or store the standardized image data (or encoded version) in a data store or other memory device.

In some cases, when generating the standardized image data from the color image data (or device-specific color image data), the camera 202a may modify the image data, such as by reducing the depth or bits used to indicate a color value for some or all pixels. For example, the color image data may use 16 bits for a color value for a particular pixel, whereas the standardized image data may use 8 bits for the color value for a corresponding pixel. By reducing the number of bits used for a pixel when generating the standardized image data, the camera 202a may decrease the size of the image data but lose precision of the color of an image. Similarly, if the camera 202a retains the sixteen bits for pixel values, it may preserve the precision of the color image, but have a file that is too large to effectively store and/or transfer.

Figure 5A:
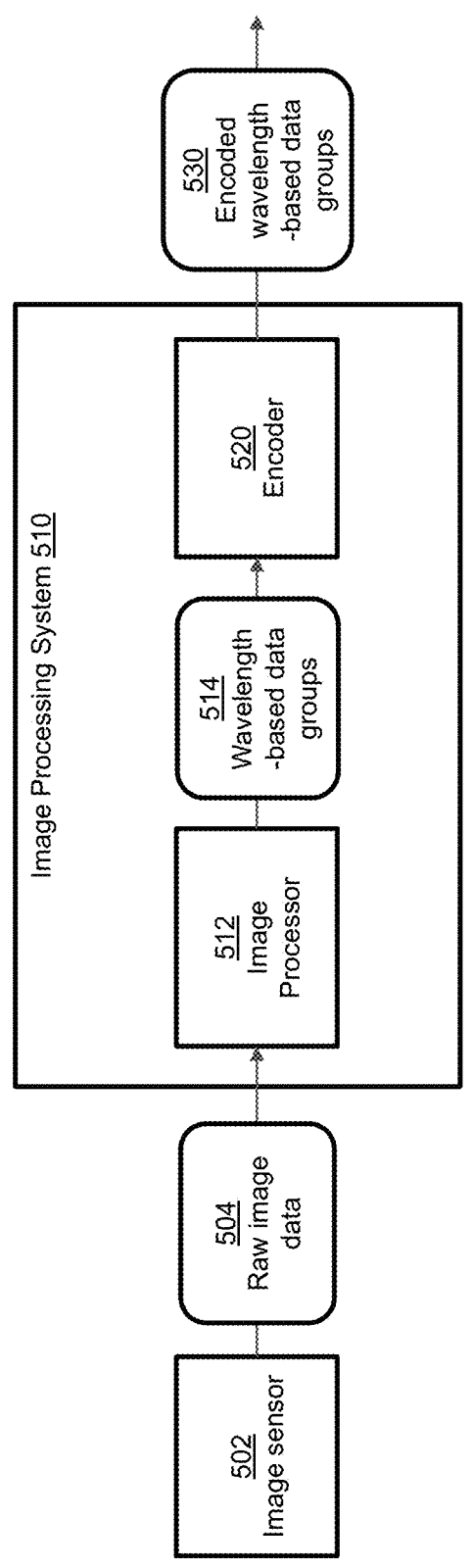
FIG. 5A is a block diagram illustrating an example image processing environment in which an image processing system processes raw image data and provides encoded wavelength-based data groups.

To address these issues, an image processing system 510 in an image processing environment 500 of FIG. 5A may generate wavelength-based data groups 514 from raw image data 504 and encode the wavelength-based data groups 514 to generate encoded wavelength-based data groups 530 (also referred to herein as encoded data 530).

In the illustrated example of FIG. 5A, the image processing system 510 includes an image processor 512 and encoder 520, however, it will be understood that the image processing system 510 may include fewer or more components. Furthermore, certain elements may be modified or removed, two or more elements combined into a single element, and/or other elements may be added. For example, in some cases the image processor 512 may include or be used to implement the encoder 520. In certain cases, the encoder 520 may be implemented separate from the image processor 512.

The image processor 512 may be configured to receive the raw image data 504 captured by an image sensor 502, and process the raw image data 504 to generate the wavelength-based data groups 514 (e.g., color image data groups or device image data groups). In some cases, the image processor 512 may include an image pre-processing function. In some such cases, the image processor 512 may perform pre-processing on the raw data 504 prior to, during, or after generating the wavelength-based data groups 514. As a result, each of the wavelength-based data groups 514 may include pixel images that have been pre-processed. Examples of the pre-processing may include, but are not limited to, one or more of black level and shadowing correction, pixel brightness transformations, pixel brightness corrections, geometric transformations, Image filtering, segmentation, or Fourier transform and Image restauration.

The encoder 520 may be configured to encode the wavelength-based data groups 514 to generate the encoded wavelength-based data groups 530, and may be implemented with hardware, software, or a combination of both.

The wavelength-based data groups 514 may include, but are not limited to, a red image matrix (e.g., first image data group), a green image matrix (e.g., second image data group) and/or a blue image matrix (e.g., third image data group). It will be understood that the wavelength-based data groups 514 may include fewer or more groups or matrices and the grouping may be different (e.g., grouped using different wavelengths). The encoder 520 may encode the different wavelength-based data groups 514 separately and generate corresponding encoded wavelength-based data groups 530. The encoded wavelength-based data groups 530 may be stored for future use and/or communicated to another device or system (e.g., the perception system 402) for further processing.

By encoding the image data groups separately, the system may increase the effectiveness of the encoding, resulting in a smaller output. For example, an encoded red image matrix, green image matrix, and blue image matrix in the aggregate may be smaller than an encoded image (from the same raw image data) with red, green, and blue components.

In some cases, the image processor 512 may increase the efficiency of the encoding by reducing the number of image groups encoded and/or encoding a differential between image groups. For example, if the color image data includes multiple green image matrices (e.g., a green-red ($G_r$) image matrix corresponding to green pixels on the same row as red pixels and a green-blue ($G_b$) image matrix corresponding to green pixels on the same row as blue pixels), the encoder 520 may encode only one of the green image matrices (e.g., $G_r$ or $G_b$ matrix) and/or a combination of the green image matrices rather than encoding both green image matrices.

In certain cases, such as when the encoder 520 encodes a combination of the image groups, the image processor 512 may determine an average between the two image groups and the encoder 520 may encode the average. For example, the image processor 512 may align pixels from a first green image matrix with pixels from a second green image matrix and calculate the average for each set of aligned pixels so that the encoder 520 may encode the resulting green averaged (Gav g) matrix.

In some cases, such as when the encoder 520 encodes one image group while omitting a related image group (e.g., image group associated with the same color), the image processor 512 may generate a differential matrix that indicates a difference between corresponding pixels of the related matrices. For example, with continued reference to the Gr and Gb image matrices, the image processor 512 may generate a green differential ($G_{diff}$) matrix that indicates the difference between pixels in the $G_b$ matrix and corresponding or respective pixels in the $G_r$ matrix so that the encoder 520 may encode the $G_{diff}$ and $G_b$ matrices (separately and/or using a different encoding algorithm), and discard the $G_r$ matrix. By generating and encoding the $G_{diff}$ matrix, the image processing system 510 may enable a (downstream) system to recreate a full fidelity version of the $G_r$ matrix, while reducing the amount of data transferred and/or stored. For example, the $G_{diff}$ matrix may use less data when encoded than the $G_r$ matrix (if encoded).

In some cases, the color image data may include other data groups, such as an infrared data group. In some such cases, the encoder 520 may encode the infrared data group separate from the other data groups and/or using a different encoding algorithm. In a non-limiting embodiment, the infrared data group may be a full substitute of one of $G_b$ or $G_r$ channel so the raw image data may be $RG_bBIR$ or $RG_rBIR$. In another non-limiting embodiment, the infrared data group may be a partial substitute of one of $G_b$ or $G_r$ channel so the raw image data may be $RG_rG_bBIR$. Encoding the different data groups separately may significantly reduce the amount of data stored and/or transferred by the image processing system 510.

In some cases, the image processing system 510 may be part of the camera 202a including the image sensor 502. In some such cases, the camera 202a may capture the raw image data 504 using the image sensor 502, process the wavelength-based data groups 514 and output the encoded wavelength-based data groups 530.

In some cases, the image processing system 510 may be separate from the camera 202a. For example, the image processing system 510 may be implemented with a separate image signal processor. In some such cases, the camera 202a may capture the raw image data 504 using the image sensor 502 and provide the captured raw image data 504 to the separate image signal processor (i.e., image processing system 510). The separate image signal processor may receive the captured raw image data 504 from the image sensor 502, process the raw image data 504, generate the wavelength-based data groups 514, and provide the wavelength-based data groups 514 to the encoder 520.

In some cases, both the image sensor 502 and the image processor 512 may be part of the camera 202a, and the encoder 520 may be disposed outside the camera 202a. In some such cases, the camera 202a may capture the raw image data 504 using the image sensor 502, process the raw image data 504 and generate the wavelength-based data groups 514, and output the wavelength-based data groups 514. The encoder 520 may receive the wavelength-based data groups 514 from the camera 202a, and encode the received wavelength-based data groups 514 and output the encoded wavelength-based data groups 530.

Processing and Encoding First Type of Raw Image Data

Figure 5B:
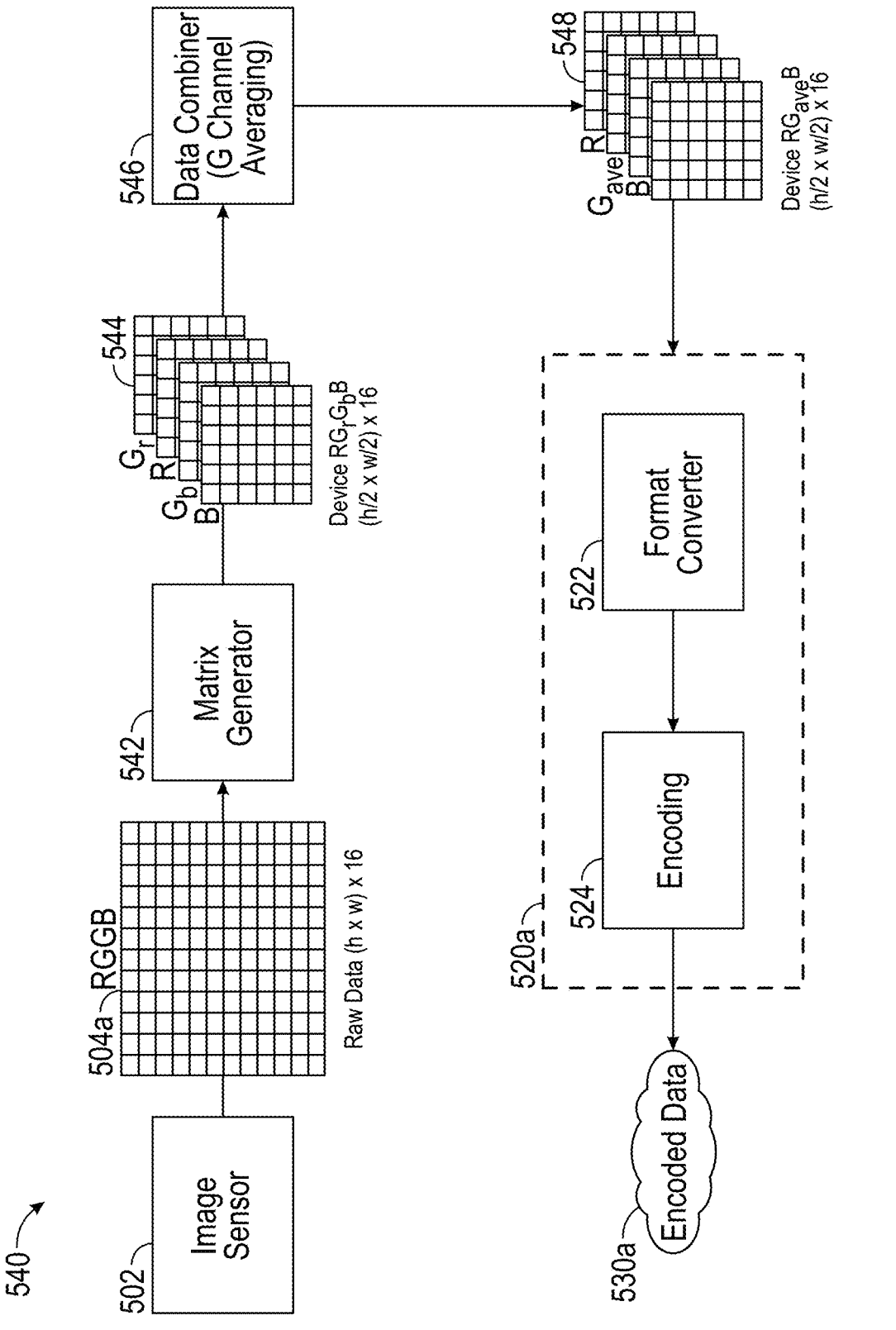
FIG. 5B is a data flow diagram illustrating an example of an image processing system in an image processing environment generating encoded data.

FIG. 5B is a data flow diagram illustrating an example of an image processing system 510 (not shown) in an image processing environment 540 generating encoded data 530a (a non-limiting example of the encoded wavelength-based data groups 530) from raw image data 504a (a non-limiting example of the raw image data 504).

In the illustrated example, the image processing system 510 includes a matrix generator 542, a data combiner 546, and an encoder 520a. In some cases, the matrix generator 542 and data combiner 546 may be implemented by the image processor 512. However, it will be understood that the image processing system 510 may include fewer or more components.

The matrix generator 542 and data combiner 546 may correspond to (or be implemented by) the image processor 512 of FIG. 5A. The encoder 520a may correspond to the encoder 520 of FIG. 5A. As described above, the camera 202a may include at least some of the elements (e.g., 502, 542, 546, 520a) shown in FIG. 5B, for example, as an ISP pipeline. In a non-limiting example, the camera 202a may include (only) the image sensor 502 in FIG. 5B. In another non-limiting example, the camera 202a may include the image sensor 502 and the matrix generator 542. In another non-limiting example, the camera 202a may include the image sensor 502, the matrix generator 542, and the data combiner 546. In another non-limiting example, the camera 202a may include all of the image sensor 502, the matrix generator 542, the data combiner 546, and the encoder 520a. In the above non-limiting examples, the image processing system may include one or more of the matrix generator 542, the data combiner 546, or the encoder 520a, depending on the elements the camera 202a includes.

The image sensor 502 may capture a scene or an object and output a first type of raw image data 504a (also referred to herein as a set of images, stream of images, or image stream) may include image data from a particular sensor (e.g., the image sensor 502) in a sensor suite. The type of images may correspond to the image sensor used to generate the raw image data 504a. For example, the raw image data 504a may include camera images generated from the image sensor 502, or lidar images generated from one or more lidar sensors, such as lidar sensors 202b. Other image types may be used, such as radar images generated from one or more radar sensors (e.g., generated from radar sensors 202c).

In some cases, a set of images may correspond to a stream of images from the same image sensor over time. Accordingly, a first image in the set of the images may be generated (or captured) by the image sensor 502 at time t0, a second image in the set of images may be generated (or captured) at time t1, etc. As the image signal processing system uses the raw image data 504a to generate the encoded data 530a, it will be understood that the image signal processing system may process the raw image data 504a in real-time or near real-time to generate the encoded data 530a.

Moreover, as there may be multiple image sensors, each image sensor may produce its own set (or stream) of images. Accordingly, images from different streams of images may be generated at approximately the same time. As such, images from different image streams taken at the same time may represent the scene of a vehicle at that time.

The raw image data 504a may include a plurality of groups of pixels. The plurality of groups of pixels may include, but are not limited to, two or more of a first group of pixels associated with a first filter, a second group of pixels associated with a second filter, a third group of pixels associated with the second filter, a fourth group of pixels associated with a third filter, or a fifth group of pixels associated with a fourth filter. In a non-limiting example, the first filter may be red, the second filter may be green, yellow or clear, the third filter may be blue, and/or the fourth filter may be an infrared (IR) filter. For example, when the first filter is red, the second filter is green, and the third filter is blue, the raw image data 504a may include RGGB (e.g., $RG_rG_bB$) raw image data 504a (e.g., shown in FIG. 5B). As another example, when the first filter is red, the second filter is yellow, and the third filter is blue, the raw image data 504a may include RYYB (e.g., $RY_rY_bB$) raw image data (not shown in FIG. 5). As another example, when the first filter is red, the second filter is clear, and the third filter is blue, the raw image data 504a may include RCCB (e.g., $RC_rC_bB$) raw image data (not shown in FIG. 5). In the above examples, when the fourth filter (infrared) is added, the raw image data 504a may include RGBIR, RGGBIR, RYBIR, RYYBIR, RCBIR, or RCCBIR, etc. It will be understood that the above described raw image data formats are merely examples, and the present disclosure is not limited thereto. For example, other raw image data formats such as RYCC, RYCIR, RYCCIR, CYYM (M: magenta filter), CYMIR, CYYMIR, CYGM, CYGMIR, RGBW (W: white filter), or BGBWIR, etc. can also be used depending on a signal format of the image sensor 502. In the illustrated example, the raw image data 504a is in the form of an RGGB matrix.

The size of the raw image data 504a may correspond to the size or specifications of the image sensor 502. For example, the raw image data 504a may be a 5616×3744 matrix or 2784×1856 matrix, depending on the specifications of the image sensor 502.

For simplicity of explanation, the raw image data 504a is shown as an 6×6 RGGB matrix that includes nine red pixels with three red pixels arranged in every other column and every other row, and nine blue pixels with three blue pixels arranged in every other row and every other column, and eighteen green pixels with three green pixels arranged in every row with red pixels, and three green pixels arranged in every column with blue pixels.

In a non-limiting example, the RGGB raw image data 504a may include 16 bits for each pixel. In another non-limiting example, the RGGB raw image data 504a may include particular bits (or depths) of pixels smaller than 16 bits, such as 8 bits, or larger than 16 bits, such as 24 bits, 32 bits, etc. For the purpose of convenience, the description will be made mainly based on the raw image data 504a having 16 bits as shown in FIG. 5B. In the illustrated example, the RGGB raw image data 504a may have a pixel dimension of (height (h)×width (w))×16 (bits).

The matrix generator 542 may receive the raw data 504a and generate one or more wavelength-based data groups or one or more separate data matrices 544 (also referred to herein as device matrices and/or device data matrices). For example, when the raw data 504a has an $RG_rG_bB$ format, the matrix generator 542 may generate four separate data matrices including an R (red) matrix, a $G_r$ (green-red) matrix, a $G_b$ (green-blue) matrix, and a B (blue) matrix. Accordingly, the device data matrices 544 may include four separate matrices (R, $G_r$, $G_b$, and B). Some or all of the data matrices 544 may be half the height and width of the corresponding raw data 504a. Taking into account the depth of the pixels, some or all of the data matrices 544 may have the dimensions h/2×w/2×16 bits (with height and width being relative to the corresponding raw image data 504a). It will be understood that the half size scenario described above is merely an example, and the device data matrices 544 may include other pixel dimensions or depths.

In some cases, the matrix generator 542 may not include an image pre-processor or an image pre-processing function. In some such cases, the pre-processing function may be incorporated into the image sensor 502. For example, in some cases, the matrix generator 542 may receive as an input, the output of the image sensor 502 (i.e., the raw image data 504a). In some such cases, the image sensor 502 may pre-process the captured image data 504a before it outputs the raw image data 504a.

The data combiner (or matrix combiner) 546 may combine one or more device data matrices 544. As a non-limiting example, consider the scenario in which the raw image data 504a has an RGGB format and the matrix generator 542 generates the device data matrices 544 as R, $G_r$, $G_b$, and B matrices. In this example, the data combiner 546 may combine the two green matrices ($G_r$, $G_b$). In some such cases, the data combiner 546 may generate one pixel value from two or more pixel values of the $G_r$ and $G_b$ matrices and/or generate one green matrix from the $G_r$ and $G_b$ matrices.

In some cases, the data combiner 546 may calculate an average of the two green matrices. For example, the data combiner 546 may align pixels from a first green image matrix (e.g., $G_r$ matrix) with pixels from a second green image matrix (e.g., $G_b$ matrix), and calculate the average for each set of aligned pixels. In some cases, the data combiner 546 may use an equation to generate an average pixel value (e.g., average grey scale value). In some such cases, the average value ($G_{ave}$) can be obtained by the equation of $G_{ave}=aG_r+cG_b$ (a and c are constants). The above-described averaging methods are merely examples, and other methods such may be used.

As another non-limiting example, consider the scenario in which the raw image data 504a has an RYYB format and the matrix generator 542 may generate the device data matrices 544 as R, $Y_r$, $Y_b$, and B matrices (not shown in FIG. 5B). In this example, the data combiner 546 may combine the two yellow matrices ($Y_r$, $Y_b$,). In some such cases, the data combiner 546 may generate one pixel value from two or more pixel values of the $Y_r$ and $Y_b$ matrices and/or generate one yellow matrix from the $Y_r$ and $Y_b$ matrices. In a non-limiting example, the data combiner 546 may calculate an average of the two yellow matrices as described above with respect to the RGGB format.

As yet another non-limiting example, consider the scenario in which the raw image data 504a has an RCCB format and the matrix generator 542 generates device data matrices 544 as R, $C_r$, $C_b$, and B matrices (not shown in FIG. 5B). In this example, the data combiner 546 may combine the two clear matrices ($C_r$, $C_b$). In some such cases, the data combiner 546 may generate one pixel value from two or more pixel values of the $C_r$ and $C_b$ matrices and/or generate one clear matrix from the $C_r$ and $C_b$ matrices. In a non-limiting example, the data combiner 546 may calculate an average of the two clear matrices as described above with respect to the RGGB format.

In some cases, the data combiner 546 may output a group of separate device data matrices 548 including a separate red (R) matrix, a separate blue (B) matrix, and a separate green (G) matrix.

The encoder 520a may receive the three device data matrices 548 (e.g., R matrix, $G_{ave}$ matrix, and B matrix, or R matrix, B matrix, for the RGGB format), separately encode the matrices, and output the encoded data 530a. For example, the encoder 520a may firstly encode one of R, $G_{ave}$, and B matrices, secondly encode another one of R, $G_{ave}$, and B matrices, and thirdly encode the other one of R, $G_{ave}$, and B matrices. As another example, the image processing system 510 may simultaneously or substantially simultaneously encode R, $G_{ave}$, and B matrices in parallel.

The encoder 520a may be implemented with a high efficiency video coding (HEVC) encoder. The HEVC encoder may include an H264 encoder, an H265 encoder, or other HEVC encoder. The encoder 520a may also be implemented with a versatile video coding (VVC) encoder such as an H266 encoder. It will be understood that the above-described encoders are merely examples, and other video image encoders may also be used. In the illustrated example, the encoder 520a includes a signal format converter 522 and an encoding block 524. The signal format converter 522 may include an RGB2YUV converter that converts the RGB format of the device data matrices 548 into a YUV format. The encoding block 524 may encode the converted YUV device data. The encoding block 524 may compress the YUV device data and output the encoded data 530a that has a YUV data format. In some cases, when the raw image data 504 has a format other than an RGB format (such as RYB, RCB, CYM, CYG, etc.), the signal format converter 522 may convert those non-RGB formats of the device data into a YUV format. In some cases, the signal format converter 522 may convert the RGB format to other appropriate video image format other than YUV.

By formatting and separately encoding the device data matrices 548, the encoder 520a may more efficiently process the device data matrices 548. The encoded data 530a may be logged, stored in a memory, or transferred to other vehicle components, for further processing, such as the perception system 402, the planning system 404, the localization system 406, or the control system 408 (illustrated in FIG. 4A).

In the illustrated example, since the raw data 504a includes 16 bits of pixels, the encoder 520a encodes 16 bits of pixels for some or all of the separate device data matrices 548. However, it will be understood that the encoder 520a may encode using different pixel depths, such as but not limited to 8 bits, 24 bits, 32, bits, etc. For example, the encoder 520a may be an 8-bit encoder configured to encode 8 bits of device image data, a 24 bit encoder configured to encode 24 bits of device image data, or a 32 bit encoder configured to encode 32 bits of device image data.

By encoding the separate device data matrices 548 separately, the image processing system 510 may achieve improved compression results, which may result in smaller file sizes or the use of less memory. For example, the encoder 520a can encode a green matrix more efficiently than a RGB matrix (e.g., with RGB pixels), which can result in a smaller file size and less storage used. Accordingly, the encoded separate device data matrices 548 may be smaller than an encoded RGB image (with similar pixel depths).

Processing and Encoding Second Type of Raw Image Data

Figure 5C:
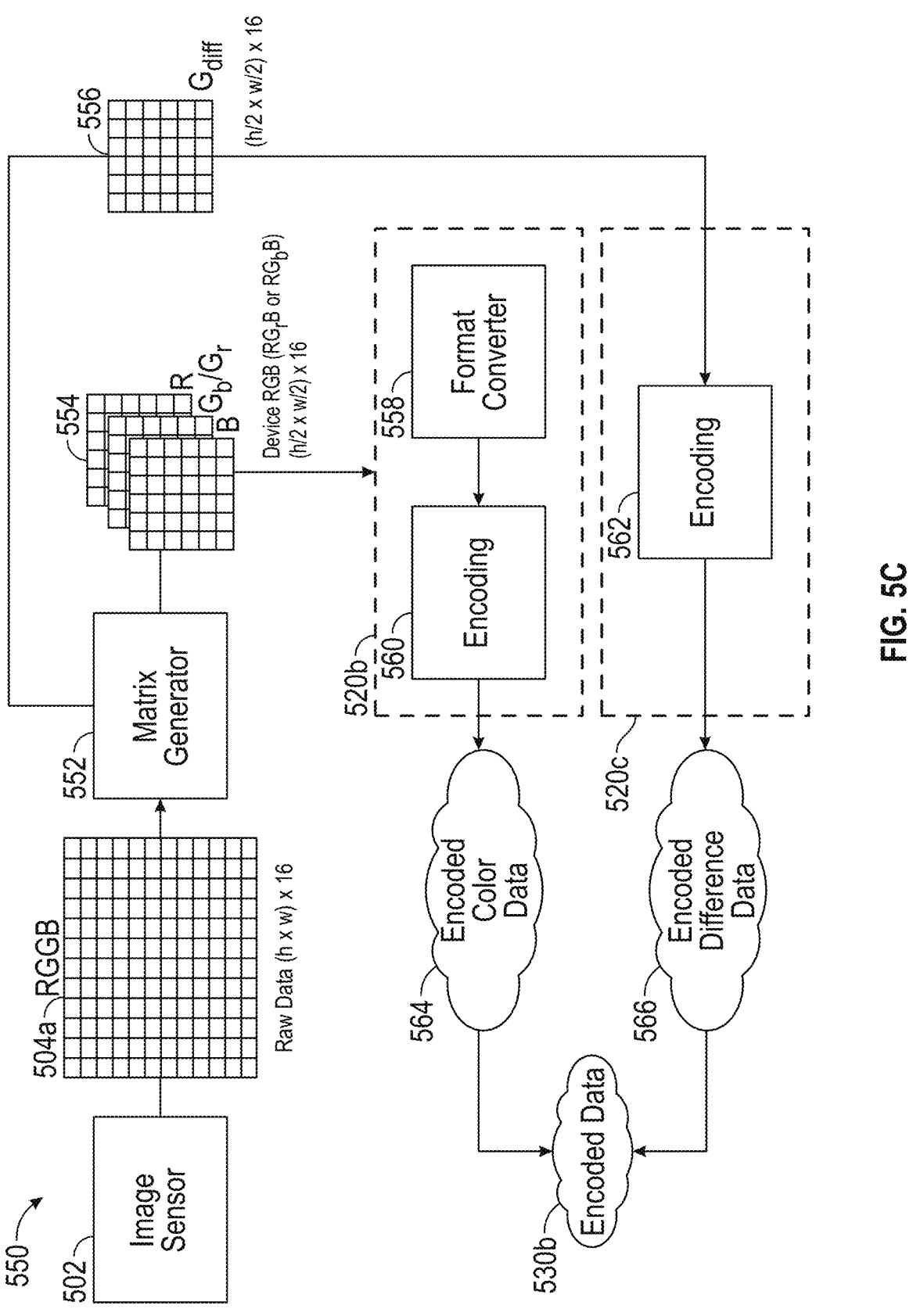
FIG. 5C is a data flow diagram illustrating an example of an image processing system in an image processing environment generating encoded data.

FIG. 5C is a data flow diagram illustrating an example of an image processing system 510 (not shown) in an image processing environment 550 generating encoded data 530b (a non-limiting example of the encoded wavelength-based data groups 530) from the raw image data 504a received from the image sensor 502.

In the illustrated example, the image processing system 510 includes a matrix generator 552 and encoders 520b, 520c (examples of the encoder 520). However, it will be understood that the image processing system 510 may include fewer or more components. The matrix generator 552 may correspond to (or be implemented by) the image processor 512 of FIG. 5A.

In the illustrated example, the matrix generator 552 generates the device data matrices 554 and the differential matrix ($G_{diff}$) 556 from the raw image data 504a. The device data matrices 554 may be similar to the separate device data matrices 548 except that the device data matrices 554 include a $G_b$ or $G_r$ matrix rather than a $G_{ave}$ matrix.

As described herein, in some cases, the image processing system 510 may generate multiple matrices of the same color or wavelength-based group. In some such cases, the image processing system 510 may select one of the matrices for encoding and discard the other(s). By using one or a subset of the same-colored matrices (and discarding the other(s)), the image processing system 510 may reduce the amount of processing done by the encoder 520 and/or reduce the amount of encoded data 530b, etc. For example, with reference to FIG. 5C, the matrix generator generates (or selects) three device data matrices 554 from the raw image data 504a. In doing so, the matrix generator 552 may generate or select an $G_r$ or $G_b$ matrix (and discard the other), an R matrix, and a B matrix. In some cases, the matrix generator 552 may choose the $G_r$ or $G_b$ matrix that has a larger or smaller gray scale value or other pixel value. In another non-limiting example, the matrix generator 552 may randomly choose (only) one of a $G_r$ or $G_b$ matrix regardless of their gray scale value or other pixel value.

In some cases, the matrix generator 552 may also generate a differential matrix that indicates the difference in pixel values between one or more same-colored matrices. In the illustrated example of FIG. 5C, the matrix generator 552 generates a green differential ($G_{diff}$) matrix that indicates the difference between pixels in the $G_b$ matrix and corresponding or respective pixels in the $G_r$ matrix. Similarly, with other image formats (e.g., RYYB, RCCB, etc.), the matrix generator 552 may generate a differential matrix that indicates a difference between same-colored matrices.

The differential matrix 556 may be used in combination with a same-colored matrix of the device data matrices 554 to recreate other same-colored matrices. For example, if a $G_{diff}$ matrix is encoded along with the $G_b$ matrix, a red matrix, and blue matrix, the image processing system 510 may use the $G_{diff}$ matrix and $G_b$ matrix to recreate the $G_r$ matrix. Furthermore, when a $G_{diff}$ matrix is encoded along with the $G_r$ matrix, a red matrix, and blue matrix, the system may use the $G_{diff}$ matrix and $G_r$ matrix to recreate the $G_b$ matrix. By generating and encoding the $G_{diff}$ matrix, the image processing system 510 may recreate a full fidelity version of the $G_r$ matrix (or $G_b$ matrix), while reducing the amount of data transferred and/or stored. For example, the $G_{diff}$ matrix may use less data when encoded than the $G_r$ matrix (or $G_b$ matrix) (if encoded). Moreover, the $G_{diff}$ matrix 556 may be used to recreate a full fidelity raw image data 504a.

The encoder 520b may receive the device data matrices 554 (e.g., RG$_r$B matrices or RG$_b$B matrices, for the RGGB format), separately encode the three matrices, and output the encoded color data 564. The encoder 520b may be the same as or similar to the encoder 520a of FIG. 5B. For example, the signal format converter 558 and the encoding block 560 of FIG. 5C may be the same as or similar to the respective signal format converter 522 and encoding block 524 shown in FIG. 5B.

The encoder 520c may receive the $G_{diff}$ matrix 556, encode the received $G_{diff}$ matrix 556, and output the encoded difference data 566. The encoder 520c may be different from the encoder 520b. The encoder 520c may include an encoding block 562 configured to encode the $G_{diff}$ matrix 556. The encoder 520c or the encoding block 562 may be implemented with a lossless video encoder including, but not limited to, FFV1, range encoder, entropy encoder, arithmetic encoder, Hoffman encoder, or other encoder using lossless video coding. It will be understood that the above-described encoders are merely examples, and other video image encoders may be used.

Accordingly, the image processing system 510 may include two encoders 520b and 520c configured to encode the device matrices 554 and the differential matrix (Gain) 556 and output encoded color data 564 and encoded difference data 566, respectively. The encoded color data 564 and encoded difference data 566 may also be referred to as the encoded data 530b.

By encoding the device data matrices 554 separately, the image processing system 510 may achieve improved compression results, which may result in smaller file sizes or the use of less memory. Moreover, by selecting one or a subset of same-colored device matrices for encoding and compression, the image processing system 510 may reduce the amount of compute resources used to generate the encoded data 530b, reduce the amount of time to generate the encoded data 530b, and/or reduce the size of the encoded data 530b.

Processing and Encoding Third Type of Raw Image Data

Figure 5D:
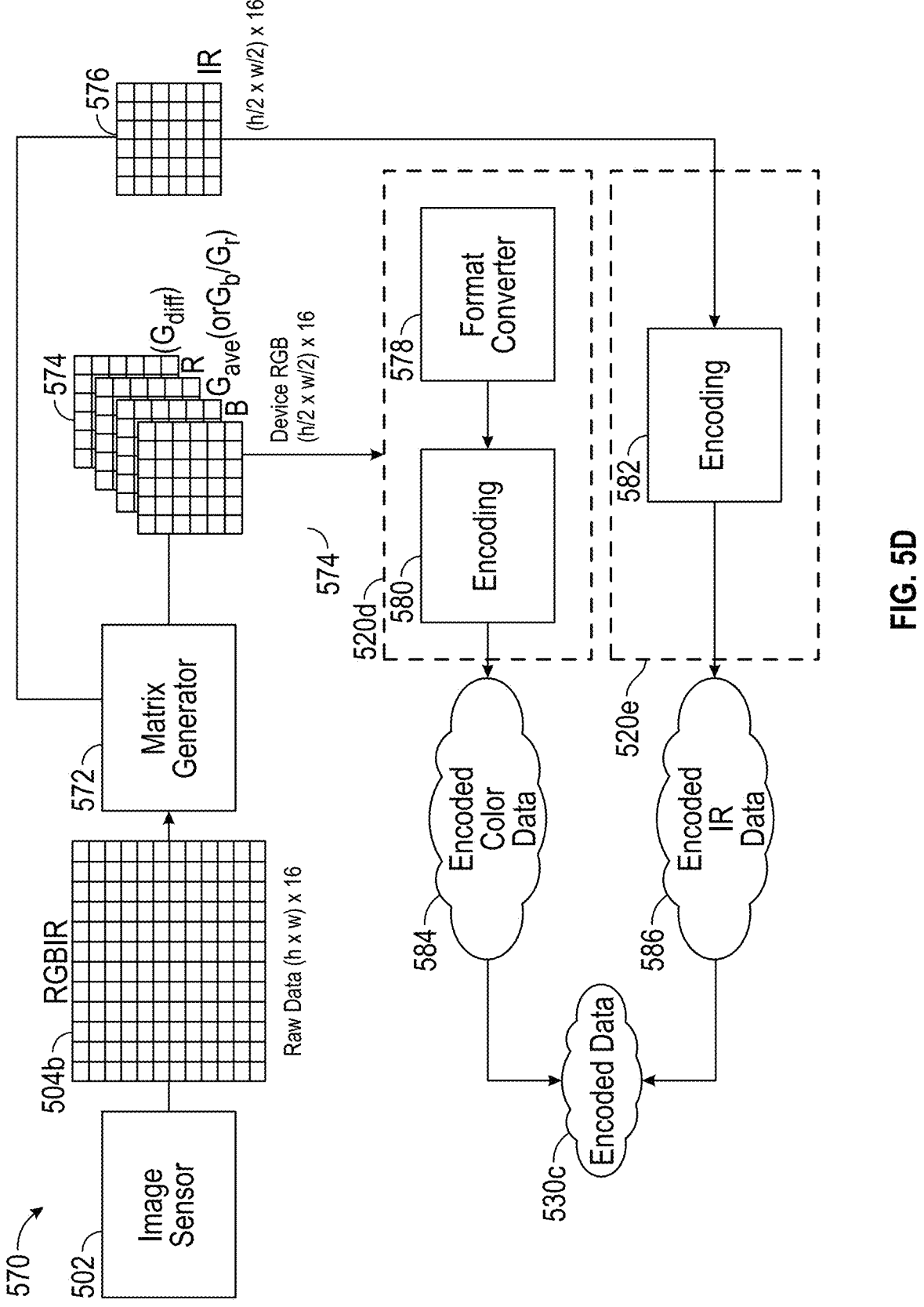
FIG. 5D is a data flow diagram illustrating an example of an image processing system in an image processing environment generating encoded data.

FIG. 5D is a data flow diagram illustrating an example of an image processing system 510 (not shown) in an image processing environment 570 generating encoded data 530c (a non-limiting example of the encoded wavelength-based data groups 530) from the raw image data 504b received from the image sensor 502.

In the illustrated example, the image processing system 510 includes a matrix generator 572 and encoders 520d, 520e (examples of the encoder 520). However, it will be understood that the image processing system 510 may include fewer or more components. The matrix generator 572 may correspond to (or be implemented by) the image processor 512 of FIG. 5A.

In the illustrated example, the image sensor 502 outputs or generates the raw image data 504b. The raw data 504b includes pixels associated with four distinct wavelength groups (red, green, blue, and infrared), which differs from the raw image data 504a (in FIGS. 5B and 5C) in that the raw data 504b includes an additional wavelength group (infrared).

Although illustrated as RGBIR, it will be understood that the raw data 504b may have various formats depending on the hardware and/or software of the image sensor 502. In some cases, the raw data 504b may have an RG$_r$BIR format or RG$_b$BIR format that can be generated by substituting one of G$_r$ or G$_b$ component of the RG$_r$G$_b$B raw data with an IR component. In some cases, the raw data 504b may have an RG$_r$G$_b$BIR format that can be generated by adding an IR component to the RG$_r$G$_b$B raw data.

The matrix generator 572 may be similar to the matrix generator 542 and/or matrix generator 552 in that it can generate one or more data matrices 574. The data matrices 574 generated by the matrix generator 572 may depend on the format of the raw data 504b and the configuration of the matrix generator 572. For example, if the raw data 504b has a RGBIR format, the one or more data matrices 574 may include a red matrix, green matrix, and blue matrix. If the raw data 504b has a RG$_b$G$_r$IR format, the matrix generator 572 may generate one or more data matrices 574 that includes a red matrix, green average matrix, and blue matrix, similar to what is described herein with reference to FIG. 5B, or generate one or more data matrices 574 that includes a red matrix, a G$_b$ or G$_r$ matrix, and a blue matrix similar to what is described herein with reference to FIG. 5C. Similar to what is described in FIGS. 5B and 5C, the encoder 520d

(an example of encoder 520), may encode the one or more data matrices 574 to provide the encoded color data 584.

As illustrated in FIG. 5D, the matrix generator 572 may also generate a $G_{diff}$ matrix similar to what is described herein with reference to FIG. 5C. For simplicity the $G_{diff}$ matrix in FIG. 5D is shown as being encoded with the other data matrices 574 and forming part of the encoded color data 584, however, it will be understood that the $G_{diff}$ matrix may be encoded separately using a different encoder and/or stored separately, as described herein at least with reference to FIG. 5C.

As illustrated in FIG. 5D, the matrix generator 572 may also generate an IR matrix 576. The IR matrix 576 may have dimensions similar to the one or more data matrices 574 (h/2*w/2*bit depth). A separate encoder, encoder 520e, may encode the IR matrix 576 to generate the encoded IR data encoded IR data 586. The encoded color data 584 and the encoded IR data 586 (together with an encoded $G_{diff}$ matrix if generated) may form the encoded data 530c. The IR matrix 576 can also be any wavelength-based data. For example, The IR matrix 576 can be $G_b$ matrix and the one or more data matrices 574 can be an $RG_rB$ matrix.

By encoding the one or more data matrices 574 and the IR matrix 576 separately, the image processing system 510 may achieve improved compression results, which may result in smaller file sizes or the use of less memory. For example, the encoder 520a can encode the IR matrix 576 more efficiently than an RGBIR matrix (e.g., with RGBIR pixels), which can result in a smaller file size and less storage used. Accordingly, the encoded data 530c may be smaller than an encoded RGBIR image (with similar pixel depths).

Encoding Flow Example

Figure 6:
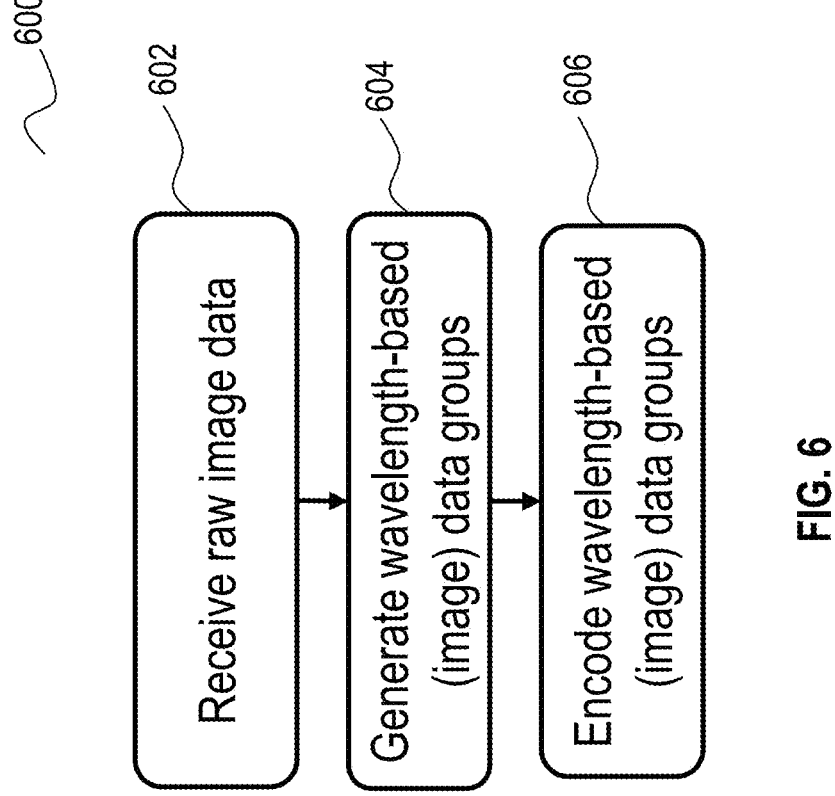
FIG. 6 is a flow diagram illustrating an example of a routine implemented by at least one processor to process raw image data and provide encoded wavelength-based data groups.

FIG. 6 is a flow diagram illustrating an example of a routine 600 implemented by at least one processor to process raw image data and provides encoded wavelength-based data groups. The flow diagram illustrated in FIG. 6 is provided for illustrative purposes only. It will be understood that one or more of the steps of the routine illustrated in FIG. 6 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle compute 400 may be used. For the purpose of convenience, the description will be made based on the image processing system 510 of FIG. 5A performing the routine 600.

At block 602, the image processing system 510 receives raw image data 504. As described herein, the raw image data 504 may correspond to an image received from an image sensor (e.g., image sensor 502) or cameras located on a vehicle at a particular time. Depending on the hardware and/or software of the image sensor and/or cameras, the raw image data 504 may have various formats including, but not limited to, RGGB, RGGBIR, RGBIR, RYYB, RYYBIR, RYBIR, RCCB, RCCBIR, RCBIR, CYYM, CYYMIR, CYMIR, CYGM, CYGMIR, RGBW, RGBWIR, etc.

At block 604, the image processing system 510 generates wavelength-based data groups 514 from the raw image data 504. The wavelength-based data groups 514 may include, but are not limited to, a red image matrix, a green image matrix, a blue image matrix, an infrared image matrix, a differential image matrix, a combined image matrix (e.g., an average image matrix), etc.

As a non-limiting example using $RG_rG_bB$ raw data, the image processing system 510 may generate an R matrix, a $G_{ave}$ matrix, and a B matrix. As another non-limiting example, using $RG_rG_bB$ raw data, the image processing system 510 may generate an R matrix, a $G_r$ matrix (or $G_b$ matrix), and a B matrix. In this example, the $G_b$ matrix (or $G_r$ matrix) may be discarded (or not used for encoding).

In another non-limiting example using $RG_rG_bB$ raw data, the image processing system 510 may generate an R matrix, a $G_r$ matrix (or $G_b$ matrix), a B matrix, and a $G_{diff}$ matrix. In this example, the $G_b$ matrix (or $G_r$ matrix) may be discarded (or not used for encoding). In another non-limiting example using $RG_rG_bB$ raw data, the image processing system 510 may generate an R matrix, a $G_r$ matrix, a $G_b$ matrix, and a B matrix.

As another non-limiting example using $RG_rG_bBIR$ raw data, the image processing system 510 may generate an R matrix, a $G_r$ matrix (or $G_b$ matrix), a B matrix, a $G_{diff}$ matrix, and an IR matrix. In this example, the $G_b$ matrix (or $G_r$ matrix) may be discarded (or not used for encoding).

As another non-limiting example using $RG_rG_bBIR$ raw data, the image processing system 510 may generate an R matrix, a $G_r$ matrix (or $G_b$ matrix), a B matrix, a $G_{ave}$ matrix, and an IR matrix. As another non-limiting example using $RG_rBIR$ raw data or $RG_bBIR$ raw data, the image processing system 510 may generate an R matrix, a $G_r$ matrix (or $G_b$ matrix), a B matrix, and an IR matrix.

At block 606, the image processing system 510 encodes the wavelength-based data groups 514 and provides the encoded wavelength-based data groups 530. As a non-limiting example, using $RG_rG_bB$ raw data, the image processing system 510 may separately encode an R matrix, a $G_{ave}$ matrix, and a B matrix. For example, the image processing system 510 may firstly encode one of R, $G_{ave}$, and B matrices, secondly encode another one of R, $G_{ave}$, and B matrices, and thirdly encode the other one of R, $G_{ave}$, and B matrices. As another example, the image processing system 510 may simultaneously or substantially simultaneously encode R, $G_{ave}$, and B matrices in parallel.

In a non-limiting example using $RG_rG_bB$ raw data, the image processing system 510 may separately encode an R matrix, a $G_r$ matrix (or $G_b$ matrix), and a B matrix, for example, using the separate encoding methods described above. In another non-limiting example using $RG_rG_bB$ raw data, the image processing system 510 may separately encode an R matrix, a $G_r$ matrix (or $G_b$ matrix), and a B matrix, for example, using the separate encoding methods described above, in a first encoder, and encode a $G_{diff}$ matrix in a second encoder different form the first encoder. In this example, the $G_b$ matrix (or $G_r$ matrix) may not be encoded or may be discarded. In another non-limiting example using $RG_rG_bBIR$ raw data, the image processing system 510 may separately encode an R matrix, a $G_r$ matrix (or $G_b$ matrix), and a B matrix in a first encoder, encode a $G_{diff}$ matrix in a second encoder different from the first encoder, and encode an IR matrix in a third encoder. The third encoder may be the same as or similar to the second encoder. In this example, the $G_b$ matrix (or $G_r$ matrix) may not be encoded (or may be discarded). In another non-limiting example using $RG_rBIR$ raw data or $RG_bBIR$ raw data, the image processing system 510 may separately encode an R matrix, a $G_r$ matrix (or $G_b$ matrix), and a B matrix in a first encoder, and encode an IR matrix in a second encoder different from the first encoder.

The encoded wavelength-based data groups 530 may be stored in a memory for future use and/or communicated to another device or system (e.g., the perception system 402) for further processing such as standardized data processing (e.g., visual applications) or non-standardized data processing (e.g., non-visual applications).

Fewer, more, or different steps may be included in the routine 600. In some cases, the image processing system 510 may perform pre-processing on the raw image data 504 or wavelength-based data groups 514. For example, the image processing system 510 may perform pre-processing on the raw image data 504 prior to, during, or after generating the wavelength-based data groups 514.

As described herein, the blocks of routine 600 may be implemented by one or more components of the vehicle 200. In a non-limiting example, one or more of blocks 602-606 may be implemented by the cameras 202a. In another non-limiting example, one or more of blocks 602-606 may be implemented by one or more of the perception system 402, the planning system 404, the localization system 406, the control system 408 shown in FIG. 4A, or another image processor (not shown).

In some cases, some or all of the blocks of routine 600 may be repeated multiple times. For example, when blocks 602-606 are performed for first wavelength-based data groups captured by the image sensor at time $t_1$, blocks 602-606 may be performed for second and subsequent wavelength-based data groups captured by the image sensor at time $t_2$, $t_3$, $t_4$, . . . , etc.

Overview of Decoding Encoded Data (Standardizing Image)

Figure 7A:
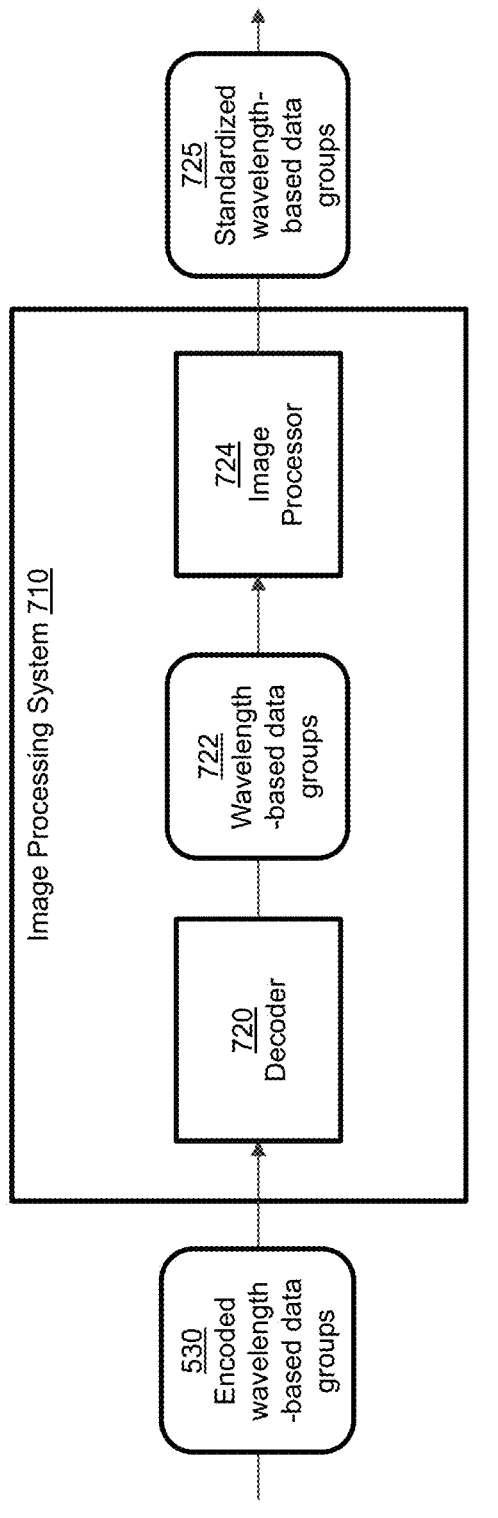
FIG. 7A is a block diagram illustrating another example image processing environment in which an image processing system processes encoded wavelength-based data groups and provides standardized wavelength-based data groups.

A system may be provided to decode the different (en-coded) data groups for different uses cases, such as but not limited to data processing use cases and/or data visualization use cases. FIG. 7A is a block diagram illustrating another example image processing environment 700 in which an image processing system 710 processes encoded wave-length-based data groups 530 and provides standardized wavelength-based data groups 725 (also referred to herein as standardized image data). In the illustrated example, the image processing system 710 includes a decoder 720 and an image processor 724. However, it will be understood that the image processing system 710 may include fewer or more components. Furthermore, certain elements may be modi-fied or removed, two or more elements combined into a single element, and/or other elements may be added.

In some cases, the image processing system 710 may decode encoded wavelength-based data groups 530 and output standardized wavelength-based data groups 725 (or wavelength-based data groups, device image data, or device data). In some cases, the image signal processing system 710 may retrieve encoded wavelength-based data groups 530 from a memory, and decode the retrieved wavelength-based data groups 530. In some cases, the image signal processing system 710 may receive encoded wavelength-based data groups 530 from another computing device or other vehicle components and decode the received encoded wavelength-based data groups.

In some cases, the image processing system 710 may convert the decoded device data into visual image data or standardized image data (e.g., standard RGB, Adobe RGB, etc.) for image processing including one or more visual applications such as annotation, viewing, or other visual applications. For example, the image processing system 710 may include a decoder 720 configured to decode the encoded wavelength-based data groups 530 and output decoded wavelength-based data groups 722. The image processing system 710 may also include an image processor 724 configured to process the decoded wavelength-based data groups 722 and provide standardized wavelength-based data groups 725. In some cases, the image processor 724 may be omitted. In some such cases, the decoder 720 may directly provide the decoded wavelength data groups 722 to other systems for further processing. In some cases, the image processing system 710 may additionally include a matrix recreating block (a matrix recreator or matrix recre-ating processor) configured to recreate matrices that have been removed or dropped during the encoding process. The image signal processing system 710 may be implemented with hardware, software, or a combination of both.

In some cases, the image processor 724 may generate the standardized image data 725 without changing a pixel depth of the decoded image data (e.g., without compressing, companding, and/or decompanding the decoded image data) such that the pixel depth of the decoded image data may be preserved in the standardized image data 725. In this way, the quality of the decoded image may be maintained.

Depending on how the image was encoded, the image processing system 710 may decode and generate the stan-dardized image data 725 differently. In some cases, an averaged data group was generated from two or more data groups and encoded (see, for example, FIG. 5B), the image processing system 710 may use the averaged data group (e.g., $G_{ave}$ matrix) along with the other data groups (not used to generate the averaged data group) to form the standard-ized image data 725 (or standardized data groups). For example, if a red matrix, blue matrix and $G_{ave}$ matrix were encoded, the image processing system 710 may use the red matrix, blue matrix and $G_{ave}$ matrix to generate the stan-dardized image data 725. In a non-limiting example, when an R matrix, a B matrix, and $G_{ave}$ matrix (i.e., both $G_r$ and $G_b$ matrices are not encoded) during the encoding procedure, the matrix recreating block may recreate the discarded matrix using the decoded $G_{ave}$ matrix. In a non-limiting example, the decoded $G_{ave}$ matrix may be used for each of $G_r$ and $G_b$ matrix which can be used to generate the stan-dardized wavelength-based data groups 725.

In certain cases, if one of a set of related data groups was encoded (and the other related data group(s) omitted) and a differential data group generated (see, for example, FIG. 5C), the image processing system 710 may use the differ-ential data group to recreate the omitted data group(s), and use the related data group(s) and other data groups to form standardized image data 725 (or standardized data groups). For example, if a $G_{diff}$ matrix (generated from $G_b$ and $G_r$ matrices) was encoded along with the $G_r$ matrix, a red matrix, and blue matrix, the system may use the $G_{diff}$ matrix and $G_r$ matrix to recreate the $G_b$ matrix, and then use the $G_r$ matrix, $G_b$ matrix, red matrix, and blue matrix to generate the standardized image data 725.

Moreover, if one data group was encoded using a different encoding algorithm, the data groups encoded using the same/similar encoding algorithm may be decoded using the same/similar decoding algorithm and the data group encoded using the different encoding algorithm may be decoded using a different decoding algorithm. Some or all of the decoded data groups may then be used to generate the standardized image data 725. For example, if an IR matrix was encoded separately (using a different encoding algo-rithm) (see, for example, FIG. 5D) than a red matrix, blue matrix, and one or more green matrices (e.g., $G_b$ matrix, $G_r$ matrix, $G_{diff}$ matrix, and/or $G_{ave}$ matrix), the IR matrix may be decoded separately from the red matrix, blue matrix, and one or more green matrices. Some or all of the red matrix, blue matrix, one or more green matrices, and IR matrix may then be used to generate the standardized image data.

In certain cases, the standardized image data 725 includes R, G, and B matrices in a standard color space, such as sRGB, Adobe RGB, etc. For example, the $G_b$, $G_r$, and $G_{ave}$ matrices may not exist in standard color spaces but may exist in device data matrices (see device data matrices 732 in FIGS. 7B and 9B, device data matrices 758, 762 in FIGS. 7C and 9C, and device data matrices 778, 784 in FIGS. 7D and 9D). Furthermore, when there is encoded color data 584 and encoded IR data 586, the decoded data may be combined before color mapping (see, for example, FIG. 7D).

Decoding Encoded First Type of Wavelength-Based Data Groups (Standardizing Image)

Figure 7B:
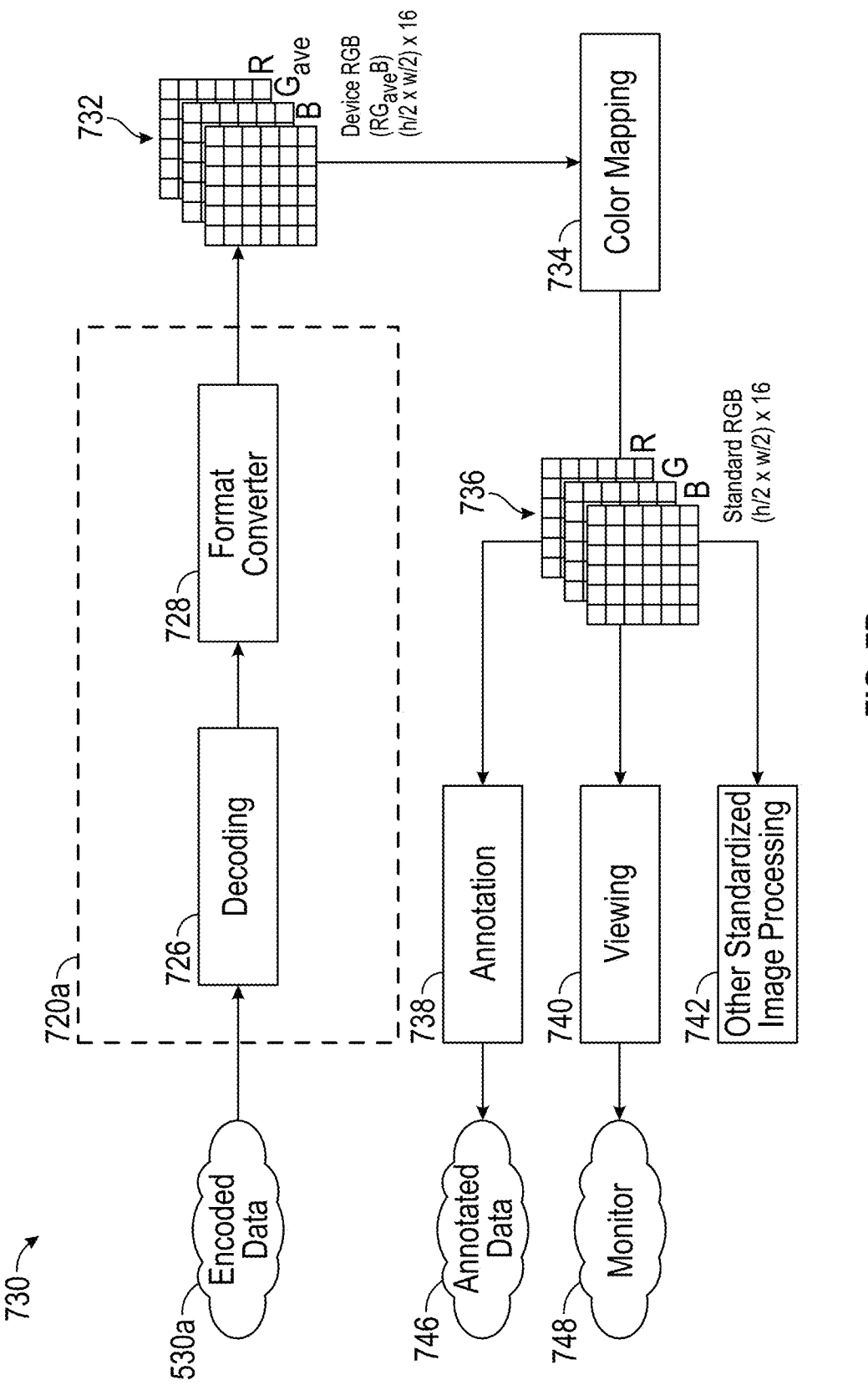
FIG. 7B is a data flow diagram illustrating an example of an image processing system decoding encoded data to provide a first type of standardized wavelength-based data groups.

FIG. 7B is a block diagram illustrating an example of an image processing environment 730 in which an image processing system processes a first type of encoded wavelength-based data groups 530a and provides standardized wavelength-based data groups 736 (e.g., standard RGB, Adobe RGB, etc.) for image processing (or one or more visual applications) including, but not limited to, annotation 738, viewing 740, or other image processing (e.g., other visual applications) 742. In the illustrated example, the image processing environment 730 may include a decoder 720a and a color mapping block 734 (or color mapper, color mapping processor). It will be understood that the image signal processing environment 730 may include fewer or more components.

The image processing environment 730 may include an image processing system (not labeled in FIG. 7B) similar to the image processing system 710 described herein at least with reference to FIG. 7A. The image processing system may include one or more of the decoder 720, the color mapping block 734, or another image processor (not shown in FIG. 7B). In a non-limiting example, the camera 202a may include one or more of the decoder 720a or the color mapping block 734. In another non-limiting example, a separate processor may include or perform the functions of the decoder 720a and/or the color mapping block 734.

The image signal processing system may reverse at least some steps of the corresponding encoding procedure (shown in FIG. 5B). For example, the image signal processing system may decode the encoded data 530a and generate the device data matrices 732 (also referred to herein as wavelength-based data groups, non-standardized wavelength-based data groups, or non-standardized image data), corresponding to the separate device data matrices 548 that had been encoded during the encoding process.

In some cases, the image processing system may retrieve encoded data 530a from a memory, decode the retrieved encoded data, and generate the standardized wavelength-based data groups 736. In some cases, the image signal processing system may receive the encoded data 530a from another computing device or other vehicle components, decode the received encoded data, and generate the standardized wavelength-based data groups 736. The encoded data 530a may include various data formats depending on how the raw data was processed and/or encoded during the encoding process. For example, the encoded data 530a may include data formats including, but not limited to, RGB, RGGB, RYB, RYYB, RCB, RCCB, CYGM, CYBW, CYM, CYYM, RGBW, etc., for the purpose of convenience, the description will be made mainly based on the encoded data 530a having an RGGB format.

In some cases, the encoded data 530a may include encoded device RGB data including an encoded R matrix, an encoded $G_{ave}$ matrix, and an encoded B matrix (see FIG. 5B). In some such cases, the image signal processing environment 730 may decode the encoded device RGB (R, $G_{ave}$, and B matrices), generate the decoded device data matrices 732 (e.g., device RGB), and convert the decoded device data matrices 732 into the standardized wavelength-based data groups 736 for visual applications.

In some cases, the image signal processing environment 730 may additionally include a matrix recreating block configured to recreate or estimate $G_b$ and/or $G_r$ matrices that were dropped during the encoding process from the decoded $G_{ave}$ matrix. In some such cases, the device data matrices 732 may include R, $G_{ave1}$, $G_{ave2}$, and B matrices. In some cases, $G_{ave1}$ matrix may be the same as $G_{ave2}$ matrix. For example, both $G_{ave1}$ and $G_{ave2}$ matrices may be the same as $G_{ave}$ matrix. In some cases, $G_{ave1}$ and $G_{ave2}$ matrices may be different from each other. In some cases, at least one of $G_{ave1}$ or $G_{ave2}$ matrix may be different from $G_{ave}$ matrix. In some such cases, at least one of $G_{ave1}$ or $G_{ave2}$ matrix may be obtained by multiplying a predetermined factor to $G_{ave}$ matrix. In a non-limiting example, the predetermined factor may be in the range of about 0.5 to about 1.5, which can be determined by camera calibration.

In some cases, the encoded data 530a may include encoded device RGB data including an encoded R matrix, an encoded $G_r$ matrix (or an encoded $G_b$ matrix), and an encoded B matrix. In some such cases, the image signal processing environment 730 may decode the encoded device RGB (R, $G_r$ (or $G_b$), and B matrices), generate the decoded device data matrices 732, and convert the decoded device data matrices 732 into the standardized wavelength-based data groups 736. In a non-limiting example, the matrix recreating block may add a $G_r$ matrix or $G_b$ matrix to the device data matrices 732 such that the standardized wavelength-based data groups 736 may be generated from the R, $G_r$, $G_r$, and B matrices or R, $G_b$, $G_b$, and B matrices.

The decoder 720a may decode the encoded data 530a that has been retrieved from a memory or received from another computing device or other vehicle components, and output decoded device data matrices 732. The decoder 720a may be implemented with a high efficiency video coding (HEVC) decoder. The HEVC decoder may include, but is not limited to, an H264 decoder, an H265 decoder, or other HEVC decoder. The decoder 720a may also be implemented with a versatile video coding (VVC) decoder such as an H266 decoder. The above listed decoders are merely examples, and other decoders for decoding video image data may also be used.

In the illustrated example, the decoder 720a includes a decoding block 726 and a signal format converter 728. In some cases, as described above with respect to FIG. 5B, the encoded data 530a may have a YUV data format. In some such cases, the decoding block 726 may decode the YUV device data (e.g., decompress the YUV device data) and output the decoded data that has a YUV data format. The signal format converter 728 may include a YUV2RGB converter that converts the YUV format of the decoded data into an RGB format. In some cases, the encoded data 530a may have a non-YUV format. In some such cases, the signal format converter 728 may convert the non-YUV format of the decoded data into an RGB format. In some cases, using non-RGB format (e.g., RCB, RYB, CYM, etc.), the signal format converter 728 may convert the YUV format or non-YUV format of the decoded data into a corresponding non-RGB format.

Depending on how the encoded data 530a was created and encoded in the encoding process, the decoded device data matrices 732 may have various formats. In a non-limiting example, the decoded device data matrices 732 may include an R matrix, a $G_{ave}$ matrix, and a B matrix. In another non-limiting example, the decoded device data matrices 732 may include an R matrix, a $G_{ave}$ matrix, a $G_{ave}$ matrix, and a B matrix. In another non-limiting example, the decoded device data matrices 732 may include an R matrix, a $G_{ave1}$ matrix, a $G_{ave2}$ matrix, and a B matrix. In another non-limiting example, the decoded device data matrices 732 may include an R matrix, a $G_r$ matrix, and a B matrix. In another non-limiting example, the decoded device data matrices 732 may include an R matrix, a $G_b$ matrix, and a B matrix.

The color mapping block 734 may transform or map colors of pixels of the device data matrices 732 to colors of pixels of the standardized wavelength-based data groups 736. In a non-limiting example, the color mapping block 734 may be implemented with a color correction matrix (CCM), a look-up table (LUT), or a neural network.

The LUT may convert colors and details in a source file (e.g., device data matrices 732) to a new destination state (standardized wavelength-based data groups 736). The LUT may use a polynomial function using the device data matrices 732 as an input and the standardized wavelength-based data groups 736 as an output.

In some cases, when a neural network is used to achieve color correction, the decoded device data matrices 732 can be provided as inputs to the neural network and trained to generate the standardized wavelength-based data groups 736 as outputs such that colors of pixels of the device data matrices 732 can be transformed or mapped to colors of pixels of the standardized wavelength-based data groups 736.

In a non-limiting example, the CCM may have a 3×3 matrix or a 4×3 matrix. However, the CCM may have other matrix sizes. In a non-limiting example, consider the scenario where color images are stored in m×n×3 arrays (m rows (height)×n columns (width)×3 colors). For the sake of simplicity, the system may transform the input color image to a k×3 array, where k=m×n. The original (uncorrected input of the color correction matrix) pixel data O can be represented as $$O = \begin{bmatrix} O_{R1} & O_{G1} & O_{B1} \\ O_{R2} & O_{G2} & O_{B2} \\ & \cdots & \\ O_{Rk} & O_{Gk} & O_{Bk} \end{bmatrix}$$

where the entries of row i, $[O_{Ri} \ O_{Gi} \ O_{Bi}]$, represent the normalized R, G, and B levels of pixel i. The transformed (corrected) array is called P, which is calculated by matrix multiplication with the color correction matrix, A (either 3×3 or 4×3).

Example 1: P=O A (A is a 3×3 matrix)

Each of the R, G, and B values of each output (corrected) pixel may be a linear combination of the three input color channels of that pixel.

$$P = \begin{bmatrix} P_{R1} & P_{G1} & P_{B1} \\ P_{R2} & P_{G2} & P_{B2} \\ & \cdots & \\ P_{Rk} & P_{Gk} & P_{Bk} \end{bmatrix} = \begin{bmatrix} O_{R1} & O_{G1} & O_{B1} \\ O_{R2} & O_{G2} & O_{B2} \\ & \cdots & \\ O_{Rk} & O_{Gk} & O_{Bk} \end{bmatrix} \begin{bmatrix} A_{11} & A_{12} & A_{13} \\ A_{21} & A_{22} & A_{23} \\ A_{31} & A_{32} & A_{33} \end{bmatrix}$$

Example 2: P=[0 1] A (A is a 4×3 matrix or a 3×3 matrix. For RGGBIR, 5×3 matrix can be used. A column of 1's is appended to the A matrix to provide offsets for each color channel, indicated by $A_{41}$, $A_{42}$, and $A_{43}$. This may make the corrected color values an affine transformation of the original inputs.

$$P = \begin{bmatrix} P_{R1} & P_{G1} & P_{B1} \\ P_{R2} & P_{G2} & P_{B2} \\ & \cdots & \\ P_{Rk} & P_{Gk} & P_{Bk} \end{bmatrix} = \begin{bmatrix} O_{R1} & O_{G1} & O_{B1} & 1 \\ O_{R2} & O_{G2} & O_{B2} & 1 \\ & \cdots & & \\ O_{Rk} & O_{Gk} & O_{Bk} & 1 \end{bmatrix} \begin{bmatrix} A_{11} & A_{12} & A_{13} \\ A_{21} & A_{22} & A_{23} \\ A_{31} & A_{32} & A_{33} \\ A_{41} & A_{42} & A_{43} \end{bmatrix}$$

In some cases, the image processing system may generate the standardized wavelength-based data groups 736 without changing a pixel depth of the decoded device image data matrices 732 (e.g., without compressing, companding, and/or decompanding the decoded image data) such that the pixel depth of the decoded image data may be preserved in the standardized wavelength-based data groups 736. In a non-limiting example, the pixel dimension of the device data matrices 732 and the pixel dimension of the standardized wavelength-based data groups 736 may be the same (e.g., (h/2×w/2)×16 (bits)). In another non-limiting example, the dimensions of the device data matrices 732 and the standardized wavelength-based data groups 736 may be (h/2× w/2)×8 (bits), (h/2×w/2)×24 (bits), (h/2×w/2)×32 (bits), etc. In this way, the quality of the decoded image may be maintained in the standardized wavelength-based data groups 736.

As the standardized wavelength-based data groups 736 may be configured for viewing by a person, the standardized wavelength-based data groups 736 may be used for various visual applications. In a non-limiting example, the standardized wavelength-based data groups 736 may be used by an operator for annotation 738 so as to generate annotated data 746. In another non-limiting example, the standardized wavelength-based data groups 736 may be used by an operator for viewing 740 the decoded image data in a display or monitor 748. In another non-limiting example, the standardized wavelength-based data groups 736 may be used for other image processing (e.g., other visual applications) 742 such as printing the decoded data, etc.

Decoding Encoded Second Type of Wavelength-Based Data Groups (Standardizing Image)

Figure 7C:
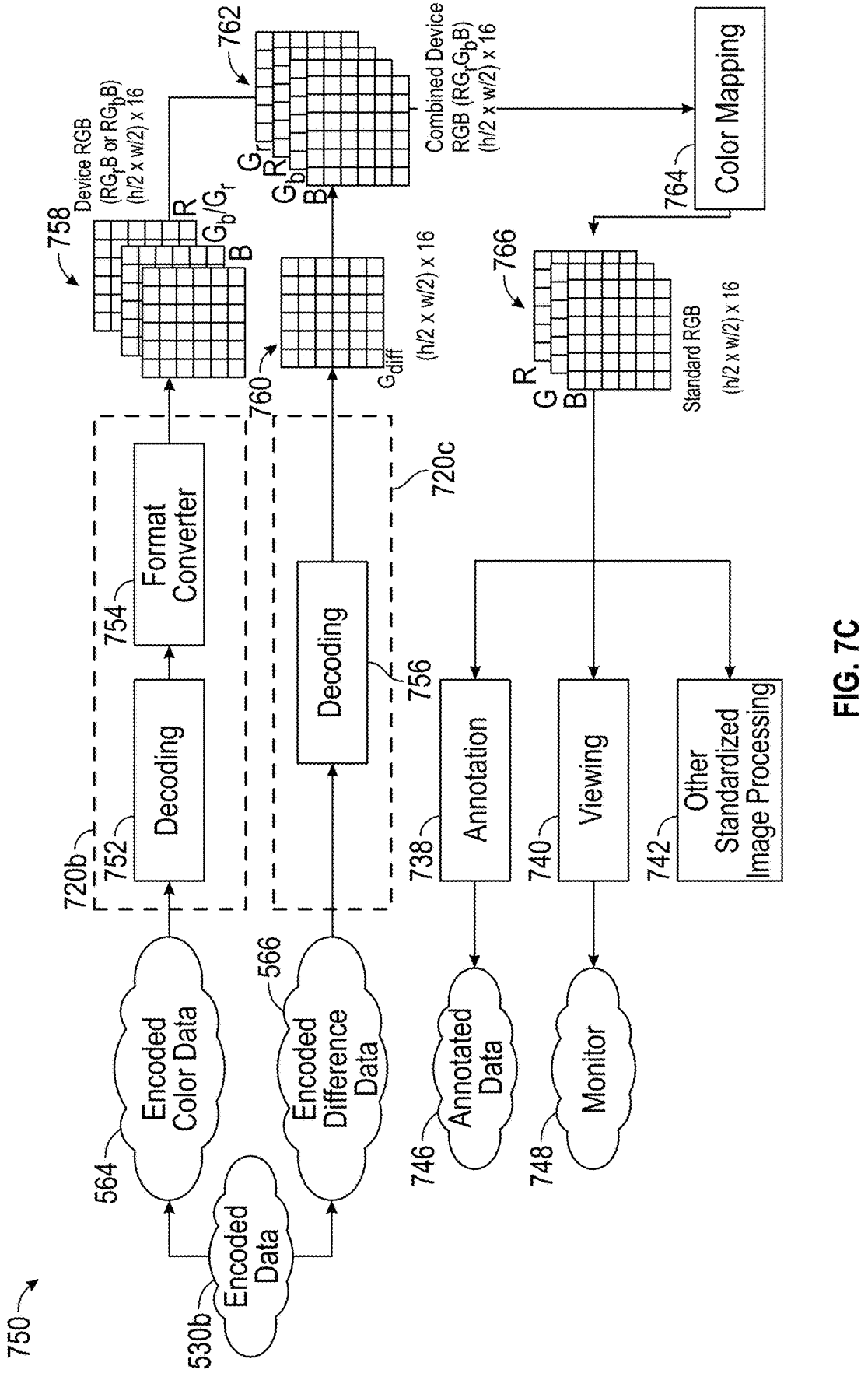
FIG. 7C is a data flow diagram illustrating an example of an image processing system decoding encoded data to provide a second type of standardized wavelength-based data groups.

FIG. 7C is a block diagram illustrating another example image processing environment 750 in which an image processing system processes a second type of encoded data 530b (e.g., second time of encoded wavelength-based data groups) and provides standardized wavelength-based data groups 766 (e.g., standard RGB, adobe RGB, etc.) for image processing (or one or more visual applications) including, but not limited to, annotation 738, viewing 740, or other image processing (e.g., other visual applications) 742. In the illustrated example, the image processing environment 750 includes a decoder 720b, a decoder 720c, and a color mapping block 764. However, it will be understood that the image signal processing environment 750 may include fewer or more components. The image processing environment 750 may include an image processing system (not labeled in FIG. 7C) that corresponds to the image processing system 710 illustrated in FIG. 7A. The image processing system may include one or more of the decoder 720b, the decoder 720c, the color mapping block 764, or another image processor (not shown in FIG. 7C). The image signal processing system may reverse at least some steps of the corresponding encoding procedure (shown in FIG. 5C). For example, the image signal processing system may separately decode encoded color data 564 and encoded difference data 566 of the encoded data 530b and respectively generate the device data matrices 758 and the differential matrix 760 that have been separately encoded during the encoding process.

The image processing environment 750 illustrated in FIG. 7C is similar to the image processing environment 730 illustrated in FIG. 7B in some respects and is different in other respects. For example, similar to the image processing environment 730, the image processing environment 750 includes the decoder 720*b*, and the color mapping block 764.

The image processing environment 750 differs from the image processing environment 730 in that the image processing environment 750 includes an additional decoder 720*c* configured to decode the encoded difference data 566 to provide the differential matrix 760. Furthermore, the device data matrices 758 of FIG. 7C differs from the device data matrices 732 of FIG. 7B in that the device data matrices 758 may include R, $G_r$ (or $G_b$), and B matrices, whereas the device data matrices 732 may include R, $G_{ave}$, and B matrices.

In some cases, the image processing system may retrieve encoded data 530*b* from a memory or receive the encoded data 530*b* from another computing device or other vehicle components. The encoded data 530*b* may include the encoded color data 564 and the encoded difference data 566. The encoded color data 564 may include an encoded version of the device RGB data (see FIG. 5C) that includes R, $G_r$ (or $G_b$), and B matrices. The encoded difference data 566 may include an encoded version of the $G_{diff}$ matrix (see FIG. 5C). The image processing environment 750 may additionally include a data splitter (or a matrix splitter) (not shown in FIG. 7C) configured to split the encoded data 530*b* into the encoded color data 564 and the encoded difference data 566 so that the encoded color data 564 is sent to the decoder 720*b* and the encoded difference data 566 is sent to the decoder 720*c*. In this way, the decoder 720*b* and the decoder 720*c* may separately and efficiently decode the encoded color data 564 and the encoded difference data 566 that may have different data sizes. While the encoded data 530*b* may include various formats including, but not limited to, RGGB, RYYB, RCCB, CYGM, CYBW, CYYM, RGBW, etc., for the purpose of convenience, the description will be made mainly based on the encoded data 530*b* having an RGGB format.

In the illustrated example, the decoder 720*b* includes a decoding block 752 and a signal format converter 754. The decoding block 752 may be the same as or similar to the decoding block 726 of FIG. 7B. The signal format converter 754 may be the same as or similar to the signal format converter 728 of FIG. 7B. The color mapping block 764 may correspond to the image processor 724 of FIG. 7A. The color mapping block 764 may be the same as or similar to the color mapping block 734 of FIG. 7B. In a non-limiting example, the camera 202*a* may include one or more of the decoder 720*b*, the decoder 720*c*, or the color mapping block 764. In another non-limiting example, a separate processor may include or perform the functions of the decoder 720*b*, the decoder 720*c*, and/or the color mapping block 764.

In some cases, the encoded data 530*b* may include encoded device data matrices (e.g., device RGB) including encoded R, $G_r$ (or $G_b$), and B matrices (see FIG. 5C). In some such cases, the image signal processing environment 750 may decode the encoded color data 564 and generate decoded device data matrices 758 including R, $G_r$ (or $G_b$), and B matrices, corresponding to the device data matrices 554. In some such cases, the image signal processing environment 750 may also separately decode the encoded difference data 566 and generate the $G_{diff}$ matrix 760. The image signal processing environment 750 may use the decoded device data matrices 758 and the decoded $G_{diff}$ matrix to generate combined device data matrices 762, including decoded R, $G_r$ (or $G_b$), $G_{diff}$, and B matrices. In some cases, the image signal processing environment 750 may additionally include a matrix recreating block configured to recreate a $G_b$ or $G_r$ matrix based on the decoded $G_{diff}$ matrix and the decoded $G_r$ (or $G_b$) matrix. For example, when the device data matrices 758 includes decoded R, $G_r$, and B matrices, the matrix recreating block may recreate a $G_b$ matrix based on the decoded $G_{diff}$ matrix and the decoded $G_r$ matrix. As another example, when the device data matrices 758 includes decoded R, $G_b$, and B matrices, the matrix recreating block may recreate a $G_r$ matrix based on the decoded $G_{diff}$ matrix and the decoded $G_b$ matrix. In either of these examples, the standardized wavelength-based data groups 766 may be generated from R, $G_r$, $G_b$, and B matrices.

The decoder 720*c* may decode the encoded difference data 566 and output the decoded data that includes the green differential ($G_{diff}$) matrix 760. The decoder 720*c* or the decoding block 756 may be implemented with a lossless video decoder including, but not limited to, FFV1, range decoder, entropy decoder, arithmetic decoder, Hoffman decoder, or other decoder using lossless video coding. It will be understood that the above-described decoders are merely examples, and other video image decoders may also be used.

Similar to the color mapping block 734 of FIG. 7B, the color mapping block 764 may transform or maps colors of pixels of each of R, $G_r$, $G_b$, and B matrices of the combined device data matrices 762 to colors of pixels of the standardized wavelength-based data groups 766. In a non-limiting example, the color mapping block 764 may be implemented with a color correction matrix (CCM), a look-up table (LUT), or a neural network as described above.

In some cases, the image processing system may generate the standardized wavelength-based data groups 766 without changing a pixel depth of the combined device data matrices 762 (e.g., without compressing, companding, and/or decompanding the decoded image data) such that the pixel depth of the decoded image data may be preserved in the standardized wavelength-based data groups 766. In a non-limiting example, the pixel dimension of the combined device data matrices 762 and the pixel dimension of the standardized wavelength-based data groups 766 may be the same (e.g., (h/2×w/2)×16 (bits), (h/2×w/2)×8 (bits), (h/2×w/2)×24 (bits), (h/2×w/2)×32 (bits), etc.). In this way, the quality of the decoded image may be maintained in the standardized wavelength-based data groups 766.

As the standardized wavelength-based data groups 766 may be human-perceptible, the standardized wavelength-based data groups 766 may be used for image processing or various visual applications. In a non-limiting example, the standardized wavelength-based data groups 766 may be used by an operator for annotation 738 so as to generate annotated data 746. In another non-limiting example, the standardized wavelength-based data groups 766 may be used by an operator for viewing 740 the decoded image data in a display or monitor 748. In another non-limiting example, the standardized wavelength-based data groups 766 may be used for other image processing (e.g., other visual applications) 742 such as printing the decoded data, etc.

Decoding Encoded Third Type of Wavelength-Based Data Groups (Standardizing Image)

Figure 7D:
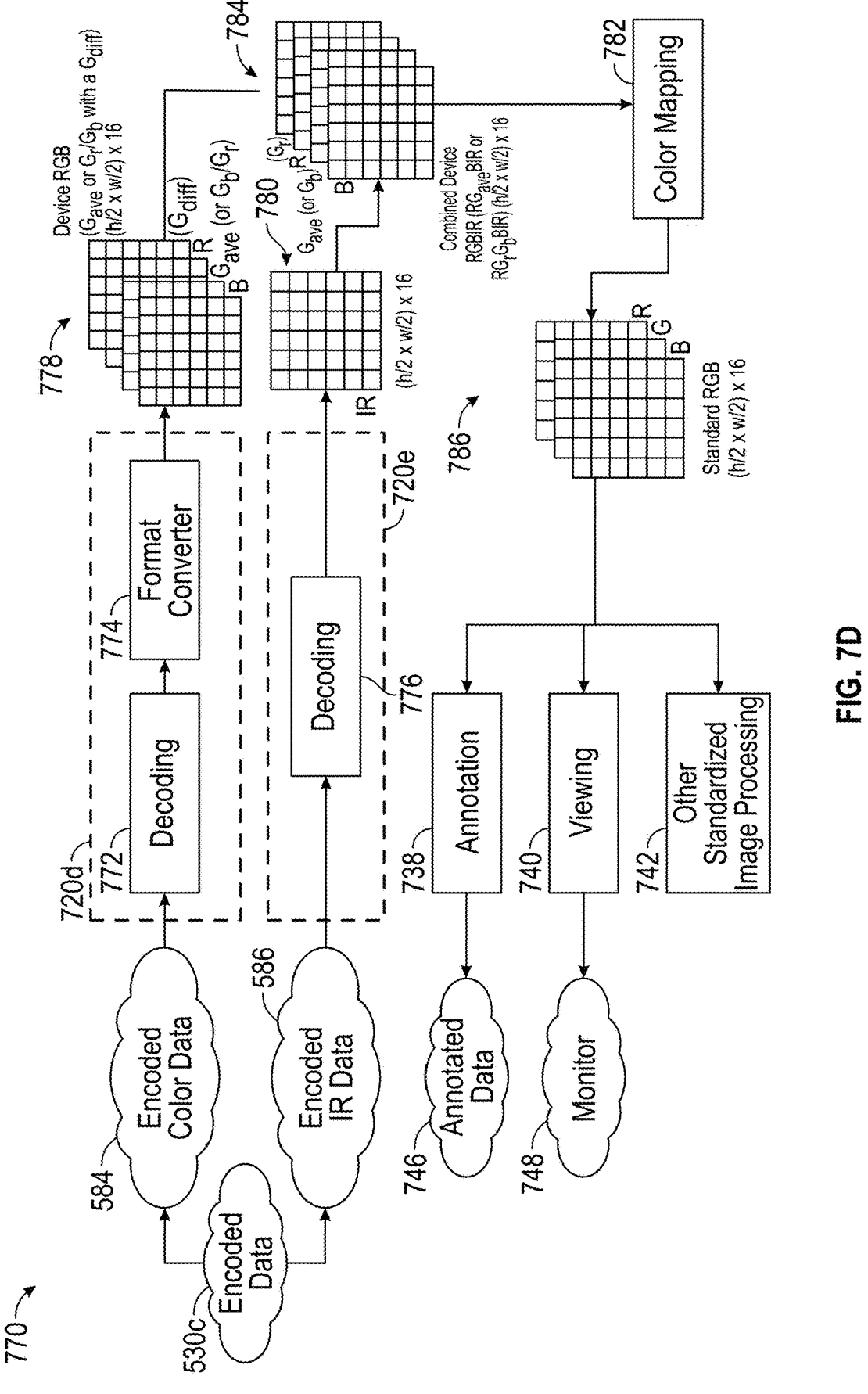
FIG. 7D is a data flow diagram illustrating an example of an image processing system decoding encoded data to provide a third type of standardized wavelength-based data groups.

FIG. 7D is a block diagram illustrating another example image processing environment 770 in which an image processing system processes a third type of encoded wavelength-based data groups 530*c* and provides combined standardized wavelength-based data groups 786 for image processing (or one or more visual applications) including, but not limited to, annotation 738, viewing 740, or other image processing (e.g., other visual applications) 742. In the illustrated example, the image processing environment 770 includes a decoder 720*d*, a decoder 720*e*, and a color mapping block 782. However, it will be understood that the image signal processing environment 770 may include fewer or more components. The image processing environment 770 may include an image processing system (not labeled in FIG. 7D) that corresponds to the image processing system 710 illustrated in FIG. 7A. The image processing system may include one or more of the decoder 720*d*, the decoder 720*e*, the color mapping block 782, or another image processor (not shown in FIG. 7D). The image signal processing system may reverse at least some steps of the corresponding encoding procedure (shown in FIG. 5D). For example, the image signal processing system may separately decode encoded color data 584 and encoded IR data 586 of the encoded data 530*c* and respectively generate the device data matrices 778 and the infrared matrix 780 that have been separately encoded during the encoding process (see FIG. 5D).

The image processing environment 770 illustrated in FIG. 7D is similar to the image processing environment 730 illustrated in FIG. 7B and the image processing environment 750 illustrated in FIG. 7C in some respects and is different in other respects. For example, similar to the image processing environment 730, the image processing environment 770 includes the decoder 720*d*, and the color mapping block 782.

The image processing environment 770 differs from the image processing environment 730 in that the image processing environment 770 includes the decoder 720*e* configured to decode the encoded IR data 586 to provide the infrared (IR) matrix 780. Furthermore, the device data matrices 778 of FIG. 7D may differ from the device data matrices 732 of FIG. 7B in that the device data matrices 778 may include R, $G_r$ (or $G_b$), and B matrices, whereas the device data matrices 732 may include R, $G_{ave}$, and B matrices.

The image processing environment 770 is similar to the image processing environment 750 in that the image processing environment 770 includes the decoder 720*e*. In the illustrated example, the image processing environment 770 differs from the image processing environment 750 in that the image processing environment 770 generates decoded IR matrix 780 whereas the image processing environment 750 generates decoded $G_{diff}$ matrix 760. However, it will be understood the image processing environment 770 may generate the decoded $G_{diff}$ matrix 760 depending on the format of the encoded data 530*c*. Although illustrated as infrared, it will be understood that the IR matrix 780 can be any wavelength-based data. For example, the IR matrix 780 can be a $G_b$ matrix and the device data matrices 778 can be a $RG_rB$ matrix.

In some cases, the image processing system may retrieve encoded data 530*c* from a memory or receive the encoded data 530*c* from another computing device or other vehicle components. The encoded data 530*c* may include encoded color data 584 and encoded IR data 586. The image processing environment 770 may additionally include a data splitter (or a matrix splitter) (not shown in FIG. 7D) configured to split the encoded data 530*c* into the encoded color data 584 and the encoded IR data 586 so that the encoded color data 584 is sent to the decoder 720*d* and the encoded IR data 586 is separately sent to the decoder 720*e*. In this way, the decoder 720*d* and the decoder 720*e* may separately and efficiently decode the encoded color data 584 and the encoded IR data 586 that may have different data sizes. While the encoded data 530*c* may include various formats including, but not limited to, RGGBIR, RGBIR, RYYBIR, RYBIR, RCCBIR, RCBIR, CYGMIR, CYBWIR, CYYMIR, CYMIR, RGBWIR, etc., for the purpose of convenience, the description will be based on the encoded data 530*b* having an RGGBIR format.

In the illustrated example, the decoder 720*d* includes a decoding block 772 and a signal format converter 774. The decoding block 772 may be the same as or similar to the decoding block 752 of FIG. 7C. The signal format converter 774 may be the same as or similar to the signal format converter 754 of FIG. 7C.

As described with respect to FIG. 5D, the encoded data 530*c* may have various formats depending on how the corresponding raw data was processed and encoded during the encoding process. In some cases, the encoded data 530*c* may have an $RG_rBIR$ format or $RG_bBIR$ format. In some cases, the raw data 504*b* may have an $RG_rG_bBIR$ format. In some such cases, the device data matrices 778 may include multiple matrices, e.g., 1) R, $G_{ave}$, and B matrices, 2) R, $G_r$, and B matrices, 3) R, $G_b$, and B matrices, or 4) R, $G_r$, $G_{diff}$, and B, matrices, or 5) R, $G_b$, $G_{diff}$, and B, matrices, etc.

Processing $RG_rG_bBIR$ Encoded Data

In some cases, the encoded data 530*c* may have an $RG_rG_bBIR$ format. In some such cases, the encoded color data 564 may include encoded R, $G_r$, $G_b$, and B matrices and the encoded IR data 586 may include an encoded IR matrix. While the description below may be applied to other data formats such as $RY_rY_bBIR$, $RC_rC_bBIR$, etc., for the purpose of convenience, the description will be made mainly based on the $RG_rG_bBIR$ format.

In a non-limiting example, consider the scenario in which the encoded color data 584 includes R, $G_{ave}$, and B matrices and the encoded IR data 586 includes an IR matrix. The decoder 720*d* may decode encoded R, $G_{ave}$, and B matrices and generate the device data matrices 778 including decoded R, $G_{ave}$, and B matrices. The decoder 720*e* may separately decode the encoded IR data 586 and generate the IR matrix 780. In some cases, the device data matrices 778 may include R, $G_{ave}$, and B matrices. In some cases, the image signal processing environment 770 may include a matrix recreator configured to generate estimated $G_r$ and $G_b$ matrices from $G_{ave}$ matrix. In some such cases, the device data matrices 778 may include R, $G_{ave1}$, $G_{ave2}$, and B matrices, where $G_r$ may be estimated as $G_{ave1}$, and $G_b$ may be estimated as $G_{ave2}$. In some cases, $G_{ave1}$ may be the same as $G_{ave2}$. For example, both $G_{ave1}$ and $G_{ave1}$ may be the same as $G_{ave}$. In some cases, $G_{ave1}$ and $G_{ave2}$ may be different from each other. In some cases, at least one of Gavel or $G_{ave2}$ may be different from $G_{ave}$. In some such cases, at least one of Gavel or $G_{ave2}$ matrix may be obtained by multiplying a predetermined factor to $G_{ave}$ matrix. In a non-limiting example, the predetermined factor may be in the range of about 0.5 to about 1.5, which can be obtained from camera calibration.

In another non-limiting example, consider the scenario in which the encoded color data 584 includes R, $G_{diff}$, B, and $G_r$ ($G_b$) matrices, and the encoded IR data 586 includes an IR matrix. In this example, the image processing environment 770 may include an additional decoder (not shown in FIG. 7D) similar to the decoder 720*e*. The decoder 720*d* may decode encoded R, $G_r$ ($G_b$), and B matrices and the additional decoder may separately decode the encoded $G_{diff}$ matrix. In some cases, the image signal processing environment 770 may include a matrix recreator (e.g., implemented using the image processor 724) configured to generate a $G_b$ ($G_r$) matrix from the $G_{diff}$ matrix and the $G_r$ (or $G_b$) matrix as described above.

Processing RG$_r$BIR Encoded Data or RG$_b$BIR Encoded Data

In some cases, the encoded data 530c may have an RG$_r$BIR format or an RG$_b$BIR format. In some such cases, the encoded color data 584 may include encoded R, $G_r$ (or $G_b$), and B matrices and the encoded IR data 586 may include an encoded IR matrix. In this example, the decoder 720d may decode encoded R, $G_r$ (or $G_b$), and B matrices, and generate the device data matrices 778 including decoded R, $G_r$ (or $G_b$), and B matrices. The decoder 720e may separately decode the encoded IR matrix and generate decoded IR matrix 780.

Decoding the different data groups separately may significantly reduce the amount of data processed. For example, as described above, the differential data groups may be decoded separately from the R, $G_r$, and B matrices (or R, $G_b$, and B matrices). Furthermore, the infrared data groups may be decoded separately from i) R, $G_r/G_b$, and B matrices, and/or ii) R, $G_{ave}$, and B matrices. The differential data groups may be decoded separately from R, $G_r$, and B matrices (or R, $G_b$, and B matrices). Moreover, both the differential data groups and the infrared data groups may be decoded separately from i) R, $G_r/G_b$, and B matrices, and/or ii) R, $G_{ave}$, and B matrices.

The color mapping block 782 may correspond to (or be implemented by) the image processor 724 of FIG. 7A. The color mapping block 782 may be the same as or similar to the color mapping block 734 of FIG. 7B or the color mapping block 764 of FIG. 7C. The color mapping block 782 may generate standardized wavelength-based data groups 786 including R, G, and B matrices in a standardized color space.

In some cases, the image processing system may generate the standardized wavelength-based data groups 786 without changing a pixel depth of the decoded device data matrices 778 and without changing a pixel depth of the IR data matrix 780 (e.g., without compressing, companding, and/or decompanding the decoded image data) such that the pixel depth of the decoded image data may be preserved in the combined standardized wavelength-based data groups 786. For example, the pixel dimension of the device data matrices 778, the pixel dimension of the IR data matrix 780, and the pixel dimension of the combined standardized wavelength-based data groups 786 may be the same (e.g., (h/2×w/2)×16 (bits), (h/2×w/2)×8 (bits), (h/2×w/2)×24 (bits), (h/2×w/2)× 32 (bits), etc.). In this way, the quality of the decoded image may be maintained in the combined standardized wavelength-based data groups 786.

As the combined standardized wavelength-based data groups 786 may be human-perceptible, it may be used for various visual applications. In a non-limiting example, the combined standardized wavelength-based data groups 786 may be used by an operator for annotation 738 so as to generate annotated data 746. In another non-limiting example, the combined standardized wavelength-based data groups 786 may be used by an operator for viewing 740 the decoded image data in a display or monitor 748. In another non-limiting example, the combined standardized wavelength-based data groups 786 may be used for other image processing (e.g., other visual applications) 742 such as printing the decoded data, etc.

Decoding Flow Example (Standardizing Image)

Figure 8:
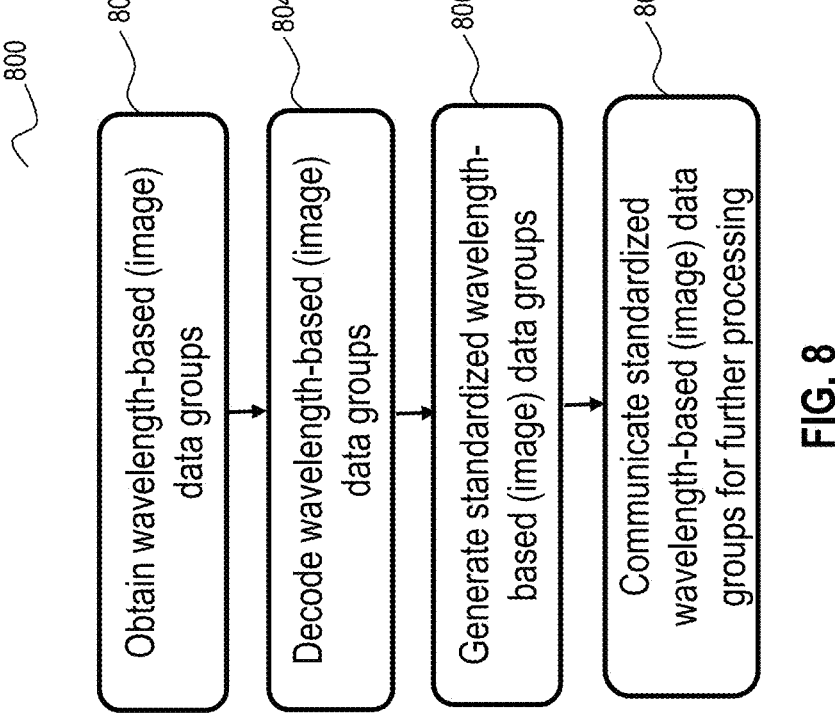
FIG. 8 is a flow diagram illustrating an example of a routine implemented by at least one processor to process encoded wavelength-based data groups and provide standardized wavelength-based data groups.

FIG. 8 is a flow diagram illustrating an example of a routine 800 implemented by at least one processor to process encoded wavelength-based data groups 530 and provide standardized wavelength-based data groups 725 (see FIG. 7A). The flow diagram illustrated in FIG. 8 is provided for illustrative purposes only. It will be understood that one or more of the steps of the routine illustrated in FIG. 8 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle compute 400 may be used. For the purpose of convenience, the description will be made based on the image processing system 710 of FIG. 7A performing the routine 800.

At block 802, the image processing system 710 obtains encoded wavelength-based data groups 530. The image signal processing system 710 may retrieve encoded wavelength-based data groups 530 from a memory, or receive the encoded wavelength-based data groups 530 from another computing device or other vehicle components. Depending on how the wavelength-based data groups were encoded during the encoding process, the encoded wavelength-based data groups may have various formats including, but not limited to, RGB, RGGB, RGGBIR, RGBIR, RYB, RYYB, RYYBIR, RYBIR, RCB, RCCB, RCCBIR, RCBIR, CYM, CYYM, CYYMIR, CYMIR, CYGM, CYGMIR, RGBW, RGBWIR, etc. However, for the purpose of convenience, the description will be made mainly based on the RGB, RGGB, RGGBIR, or RGBIR format.

At block 804, the image processing system 710 decodes the encoded wavelength-based data groups 530. At block 806, the image processing system 710 generates standardized wavelength-based data groups 725 based on the decoded wavelength-based data groups 530. Depending on how the wavelength-based data groups were encoded, the image processing system 710 may decode the encoded wavelength-based data groups 530 and generate the standardized wavelength-based data groups 725 differently.

In a non-limiting example, consider the scenario where the encoded wavelength-based data groups 530 include R, $G_{ave}$, and B matrices. In this example, the image processing system 710 may decode encoded R, $G_{ave}$, and B matrices using the same decoder. The same decoder may be implemented with a high efficiency video coding (HEVC) decoder including (but not limited to) an H264 decoder, an H265 decoder, or other HEVC encoder, or a versatile video coding (VVC) decoder such as an H266 decoder. In this example, the image processing system 710 may generate standardized wavelength-based data groups including R, G, and B matrices. The standardized wavelength-based data groups may include R, G, and B matrices. For example, for standard sRGB, the standardized wavelength-based data groups are R, G, and B matrices in sRGB color space. For Adobe color space, the standardized wavelength-based data groups are R, G, and B matrices in Abode color space.

In another non-limiting example, consider the scenario where the encoded wavelength-based data groups 530 include R, $G_r$, (or $G_b$), and B matrices. In this example, the image processing system 710 may decode the encoded R, $G_r$ (or $G_b$), and B matrices using the same decoder described above. In this example, the image processing system 710 may generate standardized wavelength-based data groups from R, $G_r$, and B matrices, or R, $G_b$, and B matrices. The image processing system 710 may also generate standardized wavelength-based data groups from R, $G_r$, $G_r$, and B matrices, or R, $G_b$, $G_b$, and B matrices.

In another non-limiting example, consider the scenario where the encoded wavelength-based data groups 530 include R, $G_r$ (or $G_b$), $G_{diff}$, and B matrices. In this example, the image processing system 710 may decode the encoded R, $G_r$ (or $G_b$), and B matrices using a first decoder, and separately decode the $G_{diff}$ matrix using a second decoder different from the first decoder. The image processing system 710 may recreate a $G_b$ (or $G_r$) matrix based on the $G_{diff}$ matrix and $G_r$ (or $G_b$) matrix. For example, when the decoded data includes R, $G_r$, and B matrices, the image processing system 710 may recreate a $G_b$ matrix based on the $G_{diff}$ matrix and $G_r$ matrix. As another example, when the decoded data includes R, $G_b$, and B matrices, the image processing system 710 may recreate a $G_r$ matrix based on the $G_{diff}$ matrix and $G_b$ matrix. In either of the examples, the image processing system 710 may generate the standardized wavelength-based data groups 725 from R, $G_r$, $G_b$, and B matrices.

In another non-limiting example, consider the scenario where the encoded wavelength-based data groups 530 include i) R, $G_{ave}$, B, and IR matrices, ii) R, $G_r$, $G_{diff}$, B, and IR matrices, and/or iii) R, $G_b$, $G_{diff}$, B, and IR matrices. When the encoded wavelength-based data groups 530 include R, $G_{ave}$, B, and IR matrices, the image processing system 710 may decode encoded R, $G_{ave}$, and B matrices using a first decoder, and separately decode the IR matrix using a second decoder different from the first decoder. In this example, the image processing system 710 may generate the standardized wavelength-based data groups 725 from R, $G_{ave}$, and B matrices, or R, Gavel, Gavel, and B matrices.

When the encoded wavelength-based data groups 530 include R, $G_r$, $G_{diff}$, B, and IR matrices, the image processing system 710 may decode the encoded R, $G_r$, and B matrices using a first decoder, separately decode the $G_{diff}$ matrix using a second decoder different from the first decoder, and separately decode the IR matrix using a third decoder the same as or similar to the second decoder. In this example, the image processing system 710 may generate the standardized wavelength-based data groups 725 from R, $G_r$, $G_b$, B, and IR matrices.

When the encoded wavelength-based data groups 530 include R, $G_b$, $G_{diff}$, B, and IR matrices, the image processing system 710 may decode the encoded R, $G_b$, and B matrices using a first decoder, separately decode the $G_{diff}$ matrix using a second decoder different from the first decoder, and separately decode the IR matrix using a third decoder the same as or similar to the second decoder. In this example, the image processing system 710 may generate standardized wavelength-based data groups from R, $G_r$, $G_b$, B, and IR matrices.

At block 808, the image processing system 710 may communicate the standardized wavelength-based data groups 725 for further processing. For example, the image processing system 710 may log or store the standardized wavelength-based data groups 725, or transfer to other vehicle components, for further processing, such as the perception system 402, the planning system 404, the localization system 406, or the control system 408 (illustrated in FIG. 4A). The further processing may include, but is not limited to, standardized data processing for one or more visual applications such as annotation, viewing, or other visual applications.

Fewer, more, or different steps may be included in the routine 800. In some cases, the image processing system 710 may perform post-processing on the decoded wavelength-based data groups.

As described herein, the blocks of routine 800 may be implemented by one or more components of the vehicle 200. In a non-limiting example, one or more of blocks 802-808 may be implemented by the cameras 202a. In another non-limiting example, one or more of blocks 802-808 may be implemented by one or more of the perception system 402, the planning system 404, the localization system 406, or the control system 408 shown in FIG. 4A, or another image processor (not shown). In another non-limiting example, one or more of blocks 802-808 may be implemented by a separate image processor of the vehicle 200.

In some cases, some or all of the blocks of routine 800 may be repeated multiple times. For example, when blocks 702-708 are performed for first wavelength-based data groups captured by the image sensor at time $t_1$, blocks 702-708 may be performed for second and subsequent wavelength-based data groups subsequently captured by the image sensor at time $t_2$, $t_3$, $t_4$, . . . , etc.

Overview of Decoding Encoded Data (Non-Standardizing Image)

Figure 9A:
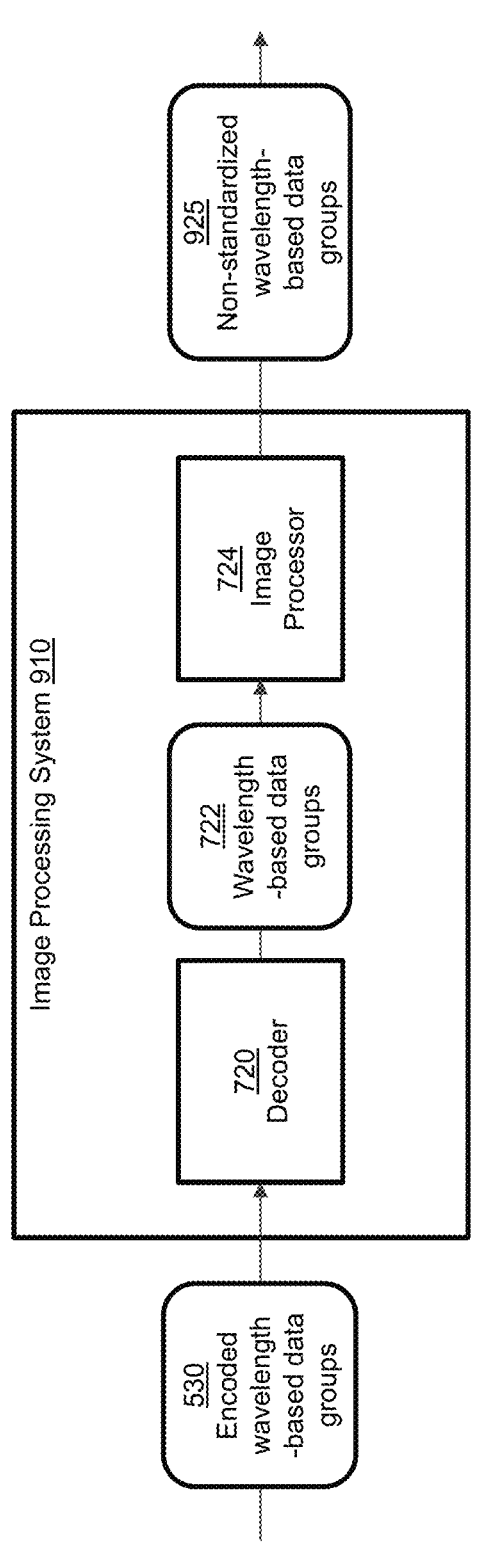
FIG. 9A is a block diagram illustrating an example image processing system processing encoded wavelength-based data groups.

FIG. 9A is a block diagram illustrating another example image processing environment 900 in which an image processing system 910 processes encoded wavelength-based data groups 530 and provides non-standardized wavelength-based data groups 925. In some cases, the image processing system 910 (e.g., a processor of planning system 404 or control system 408) may decode the encoded wavelength-based data groups 530 and process the decoded wavelength-based data groups 722 for data processing such as non-standardized image data processing and/or non-visual applications including, but not limited to, convolution neural network (CNN), sensor fusion, or storing the decoded image data, etc. In a non-limiting example, the sensor fusion may combine the non-standardized wavelength-based data groups 925 with one or more data groups obtained or generated by another sensor. In some cases, the image processing system 910 may not convert the decoded wavelength-based data groups 722 into a standardized image. Instead, the image processing system 910 may directly use the decoded wavelength-based data groups 722 for non-standardized image data processing and/or non-visual applications. In this way, the image processing system 910 may use system resources (e.g., processor and/or memory) more efficiently.

In the illustrated example, the image processing system 910 includes a decoder 720 and an image processor 920. However, it will be understood that the image processing system 910 may include fewer or more components. Furthermore, certain elements may be modified or removed, two or more elements combined into a single element, and/or other elements may be added. The decoder 720 may be configured to decode the encoded wavelength-based data groups 530 and output decoded wavelength-based data groups 722. The image processor 920 may be configured to process the decoded wavelength-based data groups 722 and provide non-standardized wavelength-based data groups 925. In some cases, the image processor 920 may be omitted. In some such cases, the decoder 720 may directly provide the decoded wavelength data groups 722 to other systems for further processing. In some cases, the image processing system 710 may additionally include a matrix recreating block (a matrix recreator or matrix recreating processor) configured to recreate matrices that have been removed or dropped during the encoding process. In some cases, the image processing environment 900 may omit an image processor that corresponds to the image processor 920 illustrated in FIG. 9A. In some such cases, the decoder 720 may directly send the wavelength-based data groups to other systems or blocks for non-standardized data processing. The image signal processing system 910 may be implemented with hardware, software, or a combination of both.

Similar to decoding encoded wavelength-based data groups 530 for data visualization use cases, the manner in which the image processing system 910 decodes/processes the wavelength-based data groups for data processing use cases may vary depending on the manner in which the wavelength-based data groups were encoded.

In some cases, if an averaged data group was generated from two or more data groups and encoded, the image processing system 910 may decode the averaged data group along with the other data groups (not used to generate the averaged data group) for processing. For example, if a red matrix, a blue matrix and a $G_{ave}$ matrix were encoded, the system may decode the red matrix, the blue matrix and the $G_{ave}$ matrix and communicate them to a neural network for training and/or object detection (e.g., without generating standardized image data). As another example, if a red matrix, a blue matrix and a $G_b$ (or $G_r$) matrix were encoded, the image processing system 910 may decode the red matrix, the blue matrix and the $G_b$ (or $G_r$) matrix and communicate them to a neural network for training and/or object detection (e.g., without generating standardized image data).

In certain cases, if one of a set of related data groups was encoded (and the other related data group(s) omitted) and a differential data group generated and encoded, the image processing system 910 may use a decoded version of the differential data group to recreate the omitted data group(s), and use the related data group(s) and other data groups for data processing (e.g., communicate it to a neural network for object detection. For example, if a $G_{diff}$ matrix (generated from a $G_b$ and $G_r$ matrix) was encoded along with the $G_r$ matrix, a red matrix, and a blue matrix, the image processing system 910 may use the $G_{diff}$ matrix and $G_r$ matrix to recreate the $G_b$ matrix, and then use the $G_r$, $G_b$, red, and blue matrices for object detection (e.g., without generating standardized image data).

Moreover, if a particular data group was encoded using a different encoding algorithm, the particular data group may be decoded using a corresponding decoding algorithm and combined with the other data groups (e.g., data groups encoded/decoded using a similar/same encoding algorithm). For example, if an IR matrix was encoded separately (using a different encoding algorithm) than a red matrix, blue matrix, and one or more green matrices (e.g., $G_b$ matrix, $G_r$ matrix, $G_{diff}$ matrix, and/or $G_{ave}$ matrix), the IR matrix may be decoded and combined with decoded versions of the red matrix, blue matrix, and one or more green matrices.

Although certain examples are provided with regard to red, blue, and green matrices, it will be understood that any color or type of matrix may be used depending on the image sensor. For example, multiple red matrices (e.g., $R_b$ matrix, $R_g$ matrix, $R_{diff}$ matrix, and/or Rave matrix), blue matrices (e.g., $B_r$ matrix, $B_r$ matrix, $B_{diff}$ matrix, and/or $B_{ave}$ matrix), clear matrices, or other matrices may be used in any combination.

Decoding Encoded First Type of Wavelength-Based Data Groups (Non-Standardizing Image)

Figure 9B:
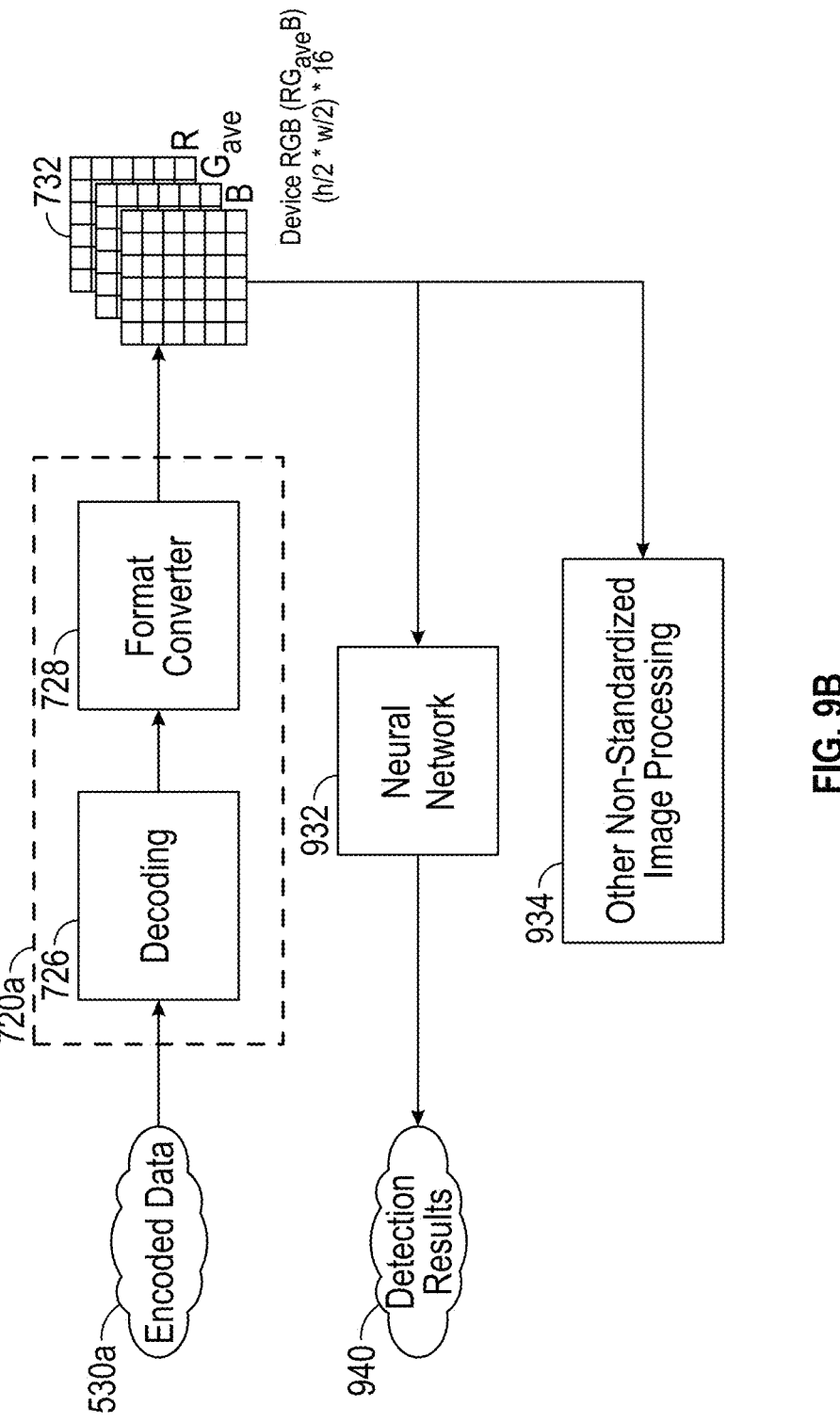
FIG. 9B is a data flow diagram illustrating an example of an image processing system processing a first type of encoded wavelength-based data groups and provides a first type of non-standardized wavelength-based data groups.

FIG. 9B is a block diagram illustrating another example image processing environment 930 in which an image processing system processes a first type of encoded wavelength-based data groups 530a and provides non-standardized wavelength-based data groups 732 for processing by a neural network 932 (e.g., for inference or training), such as a CNNs, and/or non-standardized image processing system

934 such as other non-visual applications (e.g., sensor fusion or storing). In the illustrated example, the image processing environment 930 includes a decoder 720a, a neural network 932, and other non-standardized image processing system 934. The image processing environment 930 may include an image processing system (not labeled in FIG. 9B) that corresponds to the image processing system 910 illustrated in FIG. 9A. The image processing system may include the decoder 720a. However, it will be understood that the image signal processing environment 930 may include one or more additional components.

The image processing environment 930 illustrated in FIG. 9B is similar to the image processing environment 730 illustrated in FIG. 7B in some respects and is different in other respects. For example, similar to the image processing environment 730, the image processing environment 930 includes the decoder 720a. The image processing environment 930 differs from the image processing environment 730 in that the image processing environment 930 includes the neural network 932 and other non-standardized image processing system 934, and does not include blocks or elements associated with standardizing the device data matrices 732 (see FIG. 7B).

The image signal processing system may reverse at least some steps of the corresponding encoding procedure (shown in FIG. 5B). For example, the image signal processing system may decode the encoded data 530a and generate the device data matrices 732 that has been encoded during the encoding process. In some cases, the image processing system may retrieve encoded data 530a from a memory or receive the encoded data 530a from another computing device or other vehicle components.

The encoded data 530a may include various data formats depending on how the raw data was processed and/or encoded during the encoding process. For example, the encoded data 530a may include data formats including, but not limited to, RGB, RGGB, RYB, RYYB, RCB, RCCB, CYGM, CYBW, CYM, CYYM, RGBW, etc., for the purpose of convenience, the description will be made mainly based on the encoded data 530a having an RGB or RGGB format.

In some cases, the encoded data 530a may include encoded device RGB including encoded R, $G_{ave}$, and B matrices (see FIG. 5B). In some such cases, the image signal processing environment 930 may decode the encoded device RGB (R, $G_{ave}$, and B matrices), and generate the decoded device data matrices 732 for use with the neural network 932 or other non-standardized image processing system 934. The image processing system may not convert the device data matrices 732 into a standardized image, and instead may directly send the device data matrices 732 to the neural network 932 and/or other non-standardized image processing system 934.

The decoder 720a of FIG. 9B may be the same as or similar to the decoder 720a of FIG. 7B. The decoder 720a may decode the encoded data 530a and output the device data matrices 732. In the illustrated example, the pixel dimension of the device data matrices 732 has (h/2×w/2)×16 (bits). However, other pixel dimensions such as (h/2×w/2)×8 (bits), (h/2×w/2)×24 (bits), (h/2×w/2)×32 (bits), and the like may also be used. In the illustrated example, the pixel dimension of the device data matrices 732 has R, $G_{ave}$, and B matrixes. However, as described with respect to FIG. 7B, the device data matrices 732 may have other various formats (e.g., $RG_{ave}G_{ave}B$, $RG_{ave1}G_{ave2}B$, $RG_rB$, $RG_rG_rB$, $RG_bB$, $RG_bG_bB$, etc.) depending on how the device RGB was generated and encoded during the encoding process.

The neural network 932 may receive the wavelength-based data groups 732 for training or inference. For example, the wavelength-based data groups 732 may be used to train the neural network 932 to detect objects and/or a trained neural network 932 may use the wavelength-based data groups 732 to detect objects in a scene.

Decoding Encoded Second Type of Wavelength-Based Data Groups (Non-Standardizing Image)

Figure 9C:
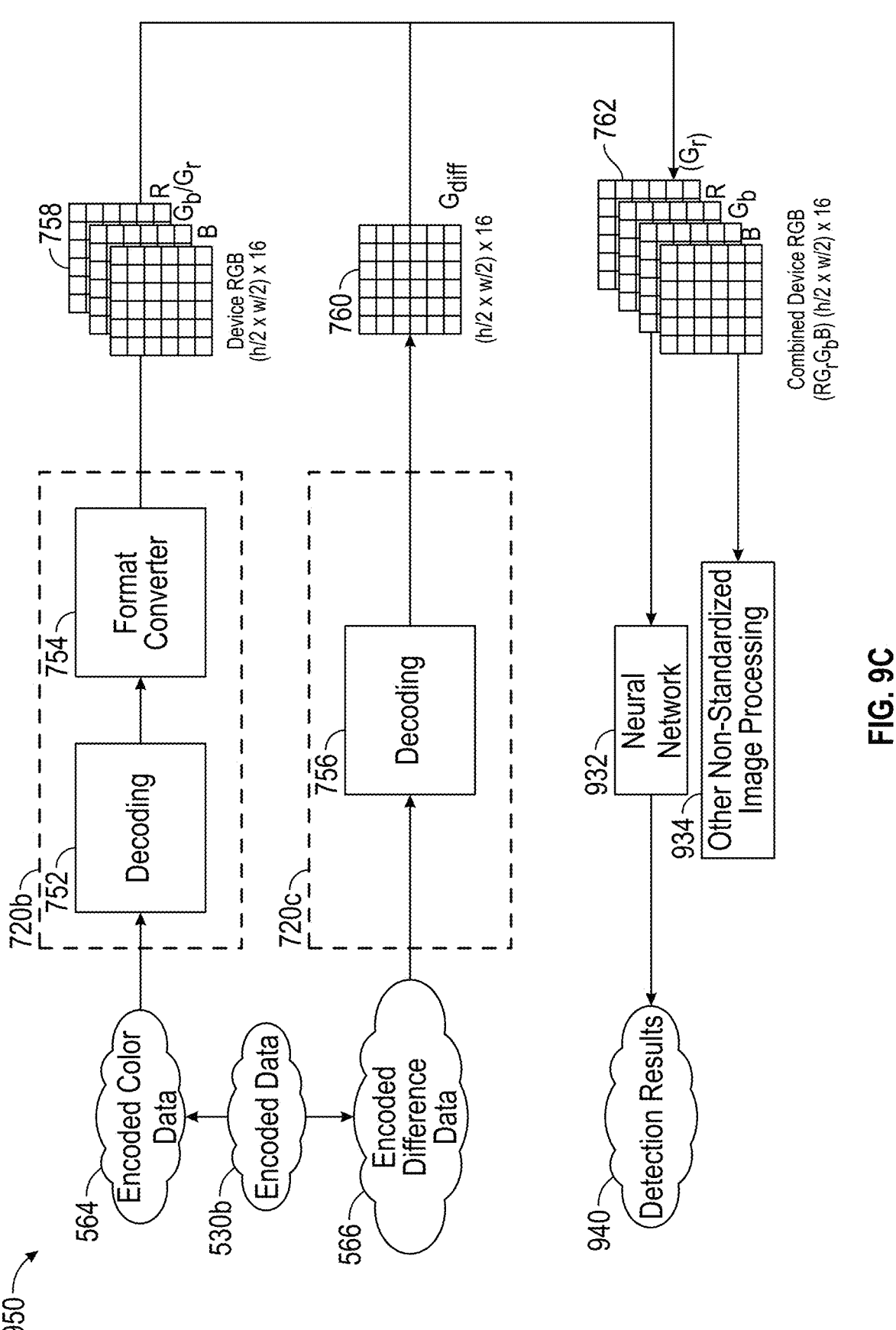
FIG. 9C is a data flow diagram illustrating an example of an image processing system processing a second type of encoded wavelength-based data groups and provides a second type of non-standardized wavelength-based data groups.

FIG. 9C is a block diagram illustrating another example image processing environment 950 in which an image processing system processes a second type of encoded wavelength-based data groups 530b and provides non-standardized wavelength-based data groups 762 for processing by a neural network 932 (e.g., for training or inference), such as a CNN, and/or non-standardized image processing system 934 such as other non-visual applications described above. In the illustrated example, the image processing environment 950 may include a decoder 720b, a decoder 720c, a neural network 932, and other non-standardized image processing system 934. The image processing environment 950 may include an image processing system (not labeled in FIG. 9C) that corresponds to the image processing system 910 illustrated in FIG. 9A. The image processing system may include the decoder 720b, the decoder 720c, and a matrix combiner (implemented using the image processor 920) configured to combine the device data matrices 758 and the differential matrix 760 to generate the non-standardized wavelength-based data groups 762. However, it will be understood that the image signal processing environment 950 may include one or more additional components.

The image processing environment 950 illustrated in FIG. 9C is similar to the image processing environment 750 illustrated in FIG. 7C and the image processing environment 930 illustrated in FIG. 9B in some respects and is different in other respects. For example, similar to the image processing environment 750, the image processing environment 950 separately decodes encoded color data 564 and encoded difference data 566 using the decoders 720b and 720c and respectively generate decoded device data matrices 758 and the differential matrix 760 to combine them into a combined wavelength-based data groups 762. The image processing environment 950 differs from the image processing environment 730 in that the image processing environment 950 includes the neural network 932 and other non-standardized image processing system 934, and does not include blocks or elements associated with standardizing the combined wavelength-based data groups 762 (see FIG. 7C).

Furthermore, similar to the image processing environment 930, the image processing environment 950 includes the neural network 932 and other non-standardized image processing system 934, and does not include blocks or elements associated with standardizing the wavelength-based data groups 762. The image processing environment 950 may differ from the image processing environment 930 in that the image processing environment 950 generates the differential matrix 760 using the decoder 720c and combines the differential matrix 760 with the decoded device data matrices 758 to generate the combined wavelength-based data groups 762.

The neural network 932 may receive the combined wavelength-based data groups 762 for training or inference. For example, the combined wavelength-based data groups 762 may be used to train the neural network 932 to detect objects and/or a trained neural network 932 may use the combined wavelength-based data groups 952 to detect objects in a scene.

Decoding Encoded Third Type of Wavelength-Based Data Groups (Non-Standardizing Image)

Figure 9D:
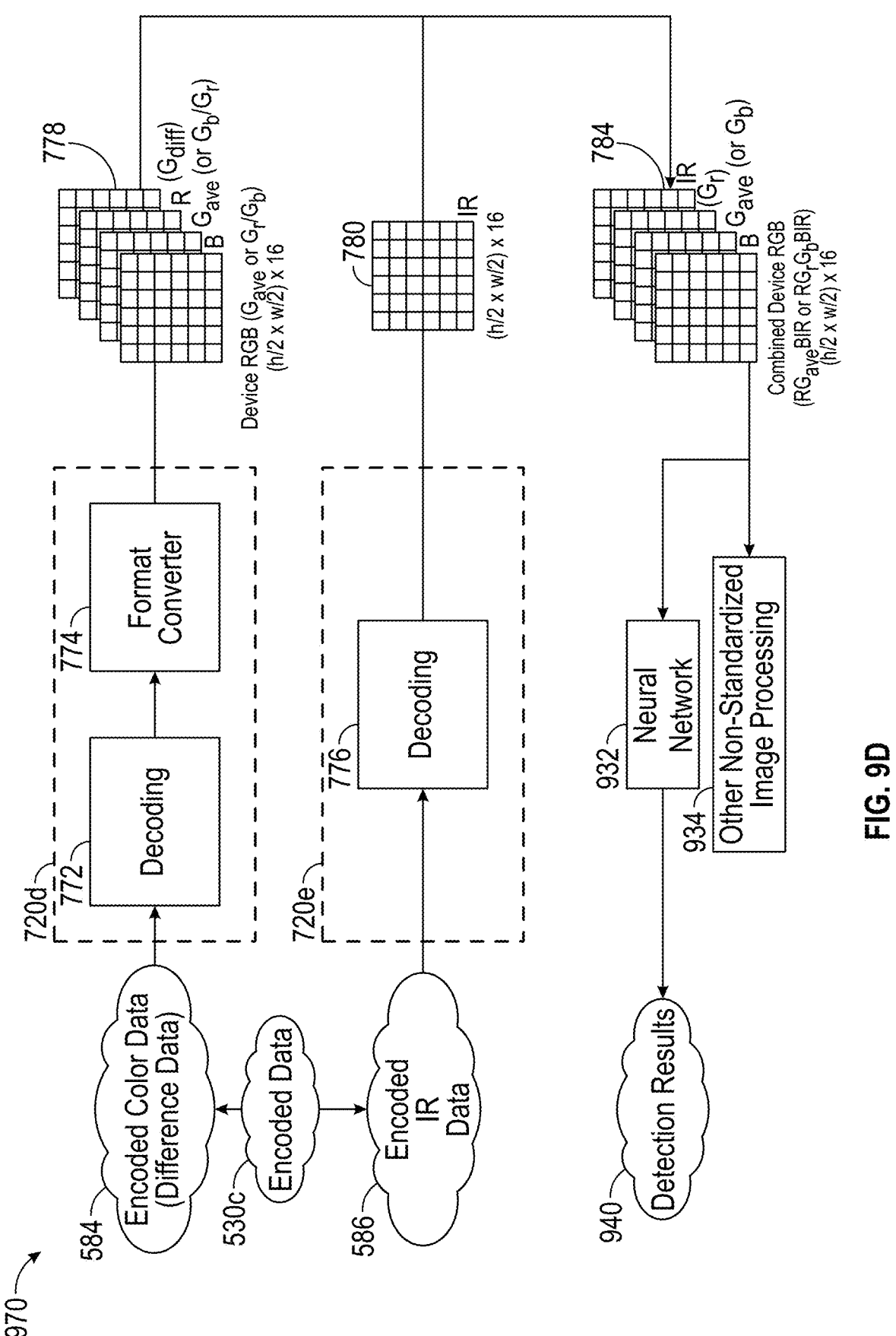
FIG. 9D is a data flow diagram illustrating an example of an image processing system processing a third type of encoded wavelength-based data groups and provides a third type of non-standardized wavelength-based data groups.

FIG. 9D is a block diagram illustrating another example image processing environment 970 in which an image processing system processes a third type of encoded wavelength-based data groups 530c and provides non-standardized wavelength-based data groups 784 for processing by neural network 932 (e.g., for training or inference) and/or non-standardized image processing system 934 such as other non-visual applications described above. In the illustrated example, the image processing environment 970 includes a decoder 720d, a decoder 720e, a neural network 932, and other non-standardized image processing system 934. The image processing environment 950 may include an image processing system (not labeled in FIG. 9D) that corresponds to the image processing system 910 illustrated in FIG. 9A. The image processing system may include the decoder 720d, the decoder 720e, and a matrix combiner (implemented using the image processor 920) configured to combine the decoded device data matrices 778 and the IR matrix 780 to generate a combined (non-standardized) wavelength-based data groups 784. However, it will be understood that the image signal processing environment 970 may include one or more additional components.

The image processing environment 970 illustrated in FIG. 9D is similar to the image processing environment 770 illustrated in FIG. 7D and the image processing environment 950 illustrated in FIG. 9C in some respects and is different in other respects. For example, similar to the image processing environment 770, the image processing environment 970 separately decodes encoded color data 584 and encoded IR (or wavelength-based channel) data 586 using the decoders 720d and 720e and respectively generate decoded device data matrices 778 and the infrared (IR) matrix 780 to combine them into a combined wavelength-based data groups 784. The image processing environment 970 differs from the image processing environment 770 in that the image processing environment 970 includes the neural network 932 and other non-standardized image processing system 934, and does not include blocks or elements associated with standardizing the combined wavelength-based data groups 784 (see FIG. 7D), such as the color mapping block 782.

Furthermore, similar to the image processing environment 950, the image processing environment 970 includes the neural network 932 and other non-standardized image processing system 934, and does not include blocks or elements associated with standardizing the wavelength-based data groups 784. The image processing environment 970 may differ from the image processing environment 950 in that the image processing environment 970 generates the infrared matrix 780 using the decoder 720e and combines the infrared matrix 780 with the decoded device data matrices 778 to generate the combined wavelength-based data groups 784. As described herein at least with reference to FIG. 7D, the decoded device data matrices 778 may include R, $G_{ave}$, and B matrices and/or R, $G_b/G_r$, $G_{diff}$ and/or B matrices, depending on the content of the encoded data 530c and/or the encoded color data 584. Moreover, although not illustrated in FIG. 7D, it will be understood that the image signal processor may be configured to generate a $G_b$ or $G_r$ matrix using the other of the $G_b$ or $G_r$ matrix and a $G_{diff}$ matrix.

The neural network 932 may receive the combined wavelength-based data groups 952 for training or inference. For example, the combined wavelength-based data groups 952 may be used to train the neural network 932 to detect objects and/or a trained neural network 932 may use the combined wavelength-based data groups 952 to detect objects in a scene.

Decoding Flow Example (Non-Standardizing Image)

Figure 10:
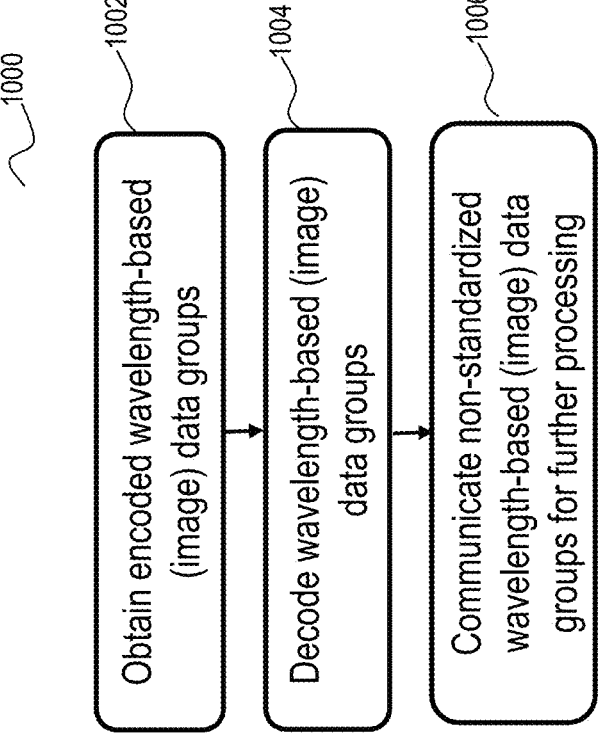
FIG. 10 is a flow diagram illustrating an example of a routine implemented by at least one processor to process encoded wavelength-based data groups and provide non-standardized wavelength-based data groups.

FIG. 10 is a flow diagram illustrating an example of a routine 1000 implemented by at least one processor to process encoded wavelength-based data groups 530 and provide non-standardized wavelength-based data groups 925 (see FIG. 9A). The flow diagram illustrated in FIG. 10 is provided for illustrative purposes only. It will be understood that one or more of the steps of the routine illustrated in FIG. 10 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle compute 400 may be used. For the purpose of convenience, the description will be made based on the image processing system 910 of FIG. 9A performing the routine 1000.

The routine 1000 illustrated in FIG. 10 is similar to the routine 800 illustrated in FIG. 8 in some respects and is different in other respects. For example, similar to the routine 800, the routine 1000 obtains wavelength-based data groups 530 and decodes the obtained wavelength-based data groups 530. The routine 1000 differs from the routine 800 in that the routine 1000 does not generate standardized wavelength-based data groups. Instead, the routine 1000 communicates the non-standardized wavelength-based data groups for further processing.

At block 1002, the image processing system 910 obtains encoded wavelength-based data groups 530. The image signal processing system 910 may retrieve encoded wavelength-based data groups 530 from a memory, or receive the encoded wavelength-based data groups 530 from another computing device or other vehicle components. Depending on how the wavelength-based data groups were encoded during the encoding process, the encoded wavelength-based data groups may have various formats as described above.

At block 1004, the image processing system 910 decodes the encoded wavelength-based data groups 530 and generates non-standardized wavelength-based data groups 925. Depending on how the wavelength-based data groups were encoded, the image processing system 910 may decode encoded wavelength-based data groups 530 differently and generates different non-standardized wavelength-based data groups as described above.

At block 1006, the image processing system 910 may communicate the non-standardized wavelength-based data groups 925 for further processing. For example, the image processing system 910 may send non-standardized wavelength-based data groups 925 to the neural network 932 for training an AI model and/or the other non-standardized image processing system 934 for other non-standardized image processing such as other non-visual applications described above with respect to FIGS. 9B-9D.

Fewer, more, or different steps may be included in the routine 1000. In some cases, the image processing system 910 may perform post-processing on the decoded wavelength-based data groups.

As described herein, the blocks of routine 1000 may be implemented by one or more components of the vehicle 200. In a non-limiting example, one or more of blocks 1002-1006 may be implemented by the cameras 202a. In another non-limiting example, one or more of blocks 1002-1006 may be implemented by one or more of the perception system 402, the planning system 404, the localization system 406, or the control system 408 shown in FIG. 4A, or another image processor (not shown). In another non-limiting example, one or more of blocks 1002-1006 may be implemented by a separate image processor of the vehicle 200.

In some cases, some or all of the blocks of routine 1000 may be repeated multiple times. For example, when blocks 1002-1006 are performed for first wavelength-based data groups captured by the image sensor at time $t_1$, blocks 1002-1006 may be performed for second and subsequent wavelength-based data groups subsequently captured by the image sensor at time $t_2$, $t_3$, $t_4$, . . . , etc.

EXAMPLES

Various example embodiments of the disclosure can be described by the following clauses:

Clause 1. A method, comprising: receiving, by at least one processor, raw image data associated with an image sensor, wherein the raw image data comprises a plurality of groups of pixels, wherein a first group of pixels of the plurality of groups of pixels comprises pixels associated with a first filter and a second group of pixels of the plurality of groups of pixels comprises pixels associated with a second filter; generating, from the raw image data, a plurality of wavelength-based data groups comprising a first wavelength-based data group and a second wavelength-based data group, the first wavelength-based data group comprising first pixels corresponding to the first group of pixels and the second wavelength-based data group comprising second pixels corresponding to the second group of pixels; and encoding, with the at least one processor, the first wavelength-based data group and the second wavelength-based data group.

Clause 2. The method of clause 1, wherein a third group of pixels of the plurality of groups of pixels comprises pixels associated with a third filter, the method further comprising: generating, from the raw image data, a third wavelength-based data group, the third wavelength-based data group comprising third pixels corresponding to the third group of pixels; and encoding the third wavelength-based data group.

Clause 3. The method of clause 2, wherein the third filter is an infrared filter.

Clause 4. The method of clause 2 or 3, wherein encoding the first wavelength-based data group and the second wavelength-based data group comprises encoding the first wavelength-based data group and the second wavelength-based data group using an encoder, and encoding the third wavelength-based data group comprises encoding the third wavelength-based data group using a different encoder.

Clause 5. The method of clause 1, wherein a third group of pixels of the plurality of groups of pixels comprises pixels associated with the second filter.

Clause 6. The method of clause 5, wherein the second filter is one of green, yellow or clear.

Clause 7. The method of clause 5 or 6, wherein generating the plurality of wavelength-based data groups comprises calculating a value for the second pixels of the second wavelength-based data group based on the second group of pixels and the third group of pixels.

Clause 8. The method of clause 7, wherein calculating the value for the second pixels of the second wavelength-based data group comprises calculating an average between at least one pixel of the second group of pixels and at least one pixel of the third group of pixels.

Clause 9. The method of clause 5 or 6, wherein generating the second wavelength-based data group comprises determining a value for the second pixels of the second wavelength-based data group based on one of the second group of pixels or the third group of pixels.

Clause 10. The method of clause 9, further comprising: determining a comparative image dataset based on differences between pixels of the second group of pixels and pixels of the third group of pixels; and encoding the comparative image dataset.

Clause 11. The method of clause 10, wherein encoding the first wavelength-based data group and the second wavelength-based data group comprises encoding the first wavelength-based data group and the second wavelength-based data group using an encoder and encoding the comparative image dataset comprises encoding the comparative image dataset using a different encoder.

Clause 12. The method of any of clauses 5-11, wherein a fourth group of pixels of the plurality of groups of pixels comprises pixels associated with a third filter, the method further comprising: generating, from the raw image data, a third wavelength-based data group, the third wavelength-based data group comprising third pixels corresponding to the fourth group of pixels; and encoding the third wavelength-based data group.

Clause 13. The method of clause 12, wherein the first filter is red, the second filter is green, and the third filter is blue.

Clause 14. The method of clause 13, wherein the second group of pixels comprises green pixels on a same row as the first group of pixels, and the third group of pixels comprises green pixels on a same row as the fourth group of pixels.

Clause 15. The method of clause 12, wherein the first filter is red, the second filter is yellow, and the third filter is blue.

Clause 16. The method of clause 12, wherein the first filter is red, the second filter is clear, and the third filter is blue.

Clause 17. The method of clause 12, wherein encoding the first wavelength-based data group and the second wavelength-based data group comprises encoding the first wavelength-based data group and the second wavelength-based data group using an encoder and encoding the third wavelength-based data group comprises encoding the third wavelength-based data group using a different encoder.

Clause 18. The method of clause 12, wherein a fifth group of pixels of the plurality of groups of pixels comprises pixels associated with a fourth filter, the method further comprising: generating, from the raw image data, a fourth wavelength-based data group, the fourth wavelength-based data group comprising fourth pixels corresponding to the fifth group of pixels; and encoding the fourth wavelength-based data group.

Clause 19. The method of clause 12, 17 or 18, wherein the third filter is an infrared filter.

Clause 20. The method of any of clauses 1-19, wherein encoding the first wavelength-based data group and the second wavelength-based data group comprises: converting values of the first pixels and the second pixels from a first format to a second format; and encoding the converted values of the first pixels and the second pixels.

Clause 21. The method of any of clauses 1-20, wherein each of the first pixels of the first wavelength-based data group correspond to a first color and each of the second pixels of the second wavelength-based data group correspond to a second color.

Clause 22. The method of any of clauses 1-21, wherein generating the first wavelength-based data group and the second wavelength-based data group comprises assigning the first group of pixels to the first wavelength-based data group and the second group of pixels to the second wavelength-based data group.

Clause 23. The method of any of clauses 1-22, wherein a height of the first wavelength-based data group and a height of the second wavelength-based data group is half a height of the raw image data, and wherein a width of the first wavelength-based data group and a width of the second wavelength-based data group is half a width of the raw image data.

Clause 24. The method of any of clauses 1-23, wherein encoding the first wavelength-based data group and the second wavelength-based data group comprises separately encoding the first wavelength-based data group and the second wavelength-based data group.

Clause 25. A system, comprising: a data store storing computer-executable instructions; and a processor configured to: receive raw image data associated with an image sensor, wherein the raw image data comprises a plurality of groups of pixels, wherein a first group of pixels of the plurality of groups of pixels comprises pixels associated with a first filter and a second group of pixels of the plurality of groups of pixels comprises pixels associated with a second filter; generate, from the raw image data, a plurality of wavelength-based data groups comprising a first wavelength-based data group and a second wavelength-based data group, the first wavelength-based data group comprising first pixels corresponding to the first group of pixels and the second wavelength-based data group comprising second pixels corresponding to the second group of pixels; and encode the first wavelength-based data group and the second wavelength-based data group.

Clause 26. Non-transitory computer-readable media comprising computer-executable instructions that, when executed by a computing system, causes the computing system to: receive raw image data associated with an image sensor, wherein the raw image data comprises a plurality of groups of pixels, wherein a first group of pixels of the plurality of groups of pixels comprises pixels associated with a first filter and a second group of pixels of the plurality of groups of pixels comprises pixels associated with a second filter; generate, from the raw image data, a plurality of wavelength-based data groups comprising a first wavelength-based data group and a second wavelength-based data group, the first wavelength-based data group comprising first pixels corresponding to the first group of pixels and the second wavelength-based data group comprising second pixels corresponding to the second group of pixels; and encode the first wavelength-based data group and the second wavelength-based data group.

Clause 27. A method, comprising: obtaining, by at least one processor, a plurality of encoded wavelength-based data groups comprising a first encoded wavelength-based data group and a second encoded wavelength-based data group, the plurality of encoded wavelength-based data groups being associated with a plurality of groups of pixels; decoding, with the at least one processor, the first encoded wavelength-based data group and the second encoded wavelength-based data group to respectively generate a first decoded wavelength-based data group and a second decoded wavelength-based data group, the first decoded wavelength-based data group comprising first pixels corresponding to a first group of pixels of the plurality of groups of pixels, the first group of pixels associated with a first filter, the second decoded wavelength-based data group comprising second pixels corresponding to a second group of pixels of the plurality of groups of pixels, the second group of pixels associated with a second filter; and converting, with the at least one processor, the first decoded wavelength-based data group and the second decoded wavelength-based data group into a standardized wavelength-based data group, wherein a height and a width of the standardized wavelength-based data group is the same as a height and a width of at least one of the first decoded wavelength-based data group and the second decoded wavelength-based data group.

Clause 28. The method of clause 27, wherein the standardized image data processing comprises one or more of: annotating the standardized wavelength-based data group; viewing the standardized wavelength-based data group; or performing other standardized image data processing on the standardized wavelength-based data group.

Clause 29. The method of clause 27 or 28, wherein a third group of pixels of the plurality of groups of pixels comprises pixels associated with a third filter, the method further comprising: obtaining, by the at least one processor, a third encoded wavelength-based data group; decoding, with the at least one processor, the third encoded wavelength-based data group to generate a third decoded wavelength-based data group, the third decoded wavelength-based data group comprising third pixels corresponding to the third group of pixels; and converting, with the at least one processor, the third decoded wavelength-based data group into a third standardized wavelength-based data group.

Clause 30. The method of clause 29, wherein the third filter is an infrared filter.

Clause 31. The method of clause 29 or 30, wherein decoding the first encoded wavelength-based data group and the second encoded wavelength-based data group comprises decoding the first encoded wavelength-based data group and the second encoded wavelength-based data group using a decoder and decoding the third encoded wavelength-based data group comprises decoding the third encoded wavelength-based data group using a different decoder to generate the third decoded wavelength-based data group.

Clause 32. The method of any of clauses 29-31, further comprising: mapping colors of the first pixels of the first decoded wavelength-based data group and the second pixels of the second decoded wavelength-based data group to colors of pixels of the standardized wavelength-based data group.

Clause 33. The method of clause 32, wherein the mapping is performed using a color correction matrix, a look-up table, or a neural network, and wherein an input of the color correction matrix, the look-up table, or the neural network comprises the colors of the first and second pixels of the first and second decoded wavelength-based data groups, and wherein an output of the color correction matrix, the look-up table, or the neural network comprises the colors of the standardized wavelength-based data groups.

Clause 34. The method of any of clauses 31-33, further comprising: combining the third wavelength-based data group with the first wavelength-based data group and the standardized wavelength-based data group to generate the standardized wavelength-based data group.

Clause 35. The method of any of clauses 31-34, wherein a height and a width of the standardized wavelength-based data group is the same as a height and a width of at least one of the first wavelength-based data group or the second wavelength-based data group.

Clause 36. The method of any of clauses 31-35, wherein a height and a width of at least one of the first decoded wavelength-based data group or the second decoded wavelength-based data group is the same as a height and a width of the standardized wavelength-based data group.

Clause 37. The method of clause 27 or 28, wherein a third group of pixels of the plurality of groups of pixels comprises pixels associated with the second filter, and wherein the second filter is one of green, yellow or clear.

Clause 38. The method of clause 37, wherein the second encoded wavelength-based data group comprises an average pixel dataset calculated based on at least one pixel of the second group of pixels and at least one pixel of the third group of pixels, and wherein decoding the first encoded wavelength-based data group and the second encoded wavelength-based data group comprises decoding the first encoded wavelength-based data group and the average pixel dataset of the second encoded wavelength-based data group with a same decoder.

Clause 39. The method of clause 38, further comprising: mapping colors of the first pixels of the first decoded wavelength-based data group and the average pixel dataset of the second decoded wavelength-based data group to colors of pixels of the standardized wavelength-based data group.

Clause 40. The method of clause 39, wherein a height and a width of the average pixel dataset of the decoded wavelength-based data group is the same as a height and a width of the standardized wavelength-based data group.

Clause 41. The method of clause 37, further comprising: obtaining, by the at least one processor, a third encoded wavelength-based data group; and decoding, with the at least one processor, the third encoded wavelength-based data group to generate a third decoded wavelength-based data group, the third decoded wavelength-based data group comprising third pixels corresponding to the third group of pixels.

Clause 42. The method of clause 41, further comprising combining the third decoded wavelength-based data group with the first decoded wavelength-based data group and the second decoded wavelength-based data group.

Clause 43. The method of clause 41 or 42, wherein the third encoded wavelength-based data group comprises a comparative image dataset generated based on differences between pixels of the second group of pixels and pixels of the third group of pixels, and wherein decoding the first encoded wavelength-based data group and the second encoded wavelength-based data group comprises decoding the first encoded wavelength-based data group and the second encoded wavelength-based data group using a decoder and decoding the third encoded wavelength-based data group comprises decoding the comparative image dataset of the third encoded wavelength-based data group using a different decoder.

Clause 44. The method of clause 43, wherein the second decoded wavelength-based data group comprises a first single-color pixel dataset calculated based on one of the second group of pixels or the third group of pixels.

Clause 45. The method of clause 44, further comprising recreating a second single-color pixel dataset corresponding to the other one of the second group of pixels or the third group of pixels based on the comparative image dataset and the first single-color pixel dataset.

Clause 46. The method of any of clauses 43-45, further comprising: mapping colors of the first pixels of the first decoded wavelength-based data group, the first single-color pixel dataset of the second decoded wavelength-based data group, and the second single-color pixel dataset to colors of pixels of the standardized wavelength-based data group.

Clause 47. The method of clause 45 or 46, wherein a height and a width of at least one of the first single-color pixel dataset of the second decoded wavelength-based data group or the comparative image dataset of the third decoded wavelength-based data group is the same as a height and a width of the standardized wavelength-based data group.

Clause 48. The method of any of clauses 27-47 wherein decoding the first encoded wavelength-based data group and the second encoded wavelength-based data group comprises: decoding the first pixels of the first encoded wavelength-based data group and the second pixels of the second encoded wavelength-based data group to respectively generate first decoded pixels and second decoded pixels; and converting values of the first decoded pixels and values of the second decoded pixels from a first format to a second format.

Clause 49. The method of clause 27 or 28, wherein a third group of pixels of the plurality of groups of pixels comprises pixels associated with the second filter, and wherein a fourth group of pixels of the plurality of groups of pixels comprises pixels associated with a third filter, the method further comprising: obtaining, from the raw image data, a third encoded wavelength-based data group; decoding the third encoded wavelength-based data group to generate a third decoded wavelength-based data group, the third decoded wavelength-based data group comprising third pixels corresponding to the fourth group of pixels; and converting the combined first, second and third decoded wavelength-based data groups into a standardized wavelength-based data group.

Clause 50. The method of clause 49, wherein the first filter is red, the second filter is green, yellow, or clear, and the third filter is blue.

Clause 51. The method of clause 49 or 50, wherein a fifth group of pixels of the plurality of groups of pixels comprises pixels associated with a fourth filter, the method further comprising: obtaining, from the raw image data, a fourth encoded wavelength-based data group; decoding the fourth encoded wavelength-based data group to generate a fourth decoded wavelength-based data group, the fourth decoded wavelength-based data group comprising fourth pixels corresponding to the fifth group of pixels; and converting the combined first, second, third and fourth decoded wavelength-based data groups into a standardized wavelength-based data group.

Clause 52. The method of clause 51, wherein decoding the third encoded wavelength-based data group comprises decoding the third encoded wavelength-based data group using a decoder and decoding the fourth encoded wavelength-based data group comprises decoding the fourth encoded wavelength-based data group using a different decoder.

Clause 53. The method of clause 51 or 52, wherein the fourth filter is an infrared filter.

Clause 54. A system, comprising: a data store storing computer-executable instructions; and a processor configured to: obtain a plurality of encoded wavelength-based data groups comprising a first encoded wavelength-based data group and a second encoded wavelength-based data group, the plurality of encoded wavelength-based data groups being associated with a plurality of groups of pixels; decode the first encoded wavelength-based data group and the second encoded wavelength-based data group to respectively generate a first decoded wavelength-based data group and a second decoded wavelength-based data group, the first decoded wavelength-based data group comprising first pixels corresponding to a first group of pixels of the plurality of groups of pixels, the first group of pixels associated with a first filter, the second decoded wavelength-based data group comprising second pixels corresponding to a second group of pixels of the plurality of groups of pixels, the second group of pixels associated with a second filter; and convert the first decoded wavelength-based data group and the second decoded wavelength-based data group into a standardized wavelength-based data group, wherein a height and a width of the standardized wavelength-based data group is the same as a height and a width of at least one of the first decoded wavelength-based data group and the second decoded wavelength-based data group.

Clause 55. Non-transitory computer-readable media comprising computer-executable instructions that, when executed by a computing system, causes the computing system to: obtain a plurality of encoded wavelength-based data groups comprising a first encoded wavelength-based data group and a second encoded wavelength-based data group, the plurality of encoded wavelength-based data groups being associated with a plurality of groups of pixels; decode the first encoded wavelength-based data group and the second encoded wavelength-based data group to respectively generate a first decoded wavelength-based data group and a second decoded wavelength-based data group, the first decoded wavelength-based data group comprising first pixels corresponding to a first group of pixels of the plurality of groups of pixels, the first group of pixels associated with a first filter, the second decoded wavelength-based data group comprising second pixels corresponding to a second group of pixels of the plurality of groups of pixels, the second group of pixels associated with a second filter; and convert the first decoded wavelength-based data group and the second decoded wavelength-based data group into a standardized wavelength-based data group, wherein a height and a width of the standardized wavelength-based data group is the same as a height and a width of at least one of the first decoded wavelength-based data group and the second decoded wavelength-based data group.

Clause 56. A method, comprising: obtaining, by at least one processor, a plurality of encoded wavelength-based data groups comprising a first encoded wavelength-based data group and a second encoded wavelength-based data group, the plurality of encoded wavelength-based data groups being associated with a plurality of groups of pixels; decoding, with the at least one processor, the first encoded wavelength-based data group and the second encoded wavelength-based data group to respectively generate a first decoded wavelength-based data group and a second decoded wavelength-based data group, the first decoded wavelength-based data group comprising first pixels corresponding to a first group of pixels of the plurality of groups of pixels, the first group of pixels associated with a first filter, the second decoded wavelength-based data group comprising second pixels corresponding to a second group of pixels of the plurality of groups of pixels, the second group of pixels associated with a second filter; and communicating, with the at least one processor, at least one of the first decoded wavelength-based data group or the second decoded wavelength-based data group, for non-standardized image data processing associated with an autonomous vehicle.

Clause 57. The method of clause 56, wherein communicating the at least one of the first decoded wavelength-based data group or the second decoded wavelength-based data group comprises communicating the at least one of the first decoded wavelength-based data group or second decoded wavelength-based data group without changing a dimension of at least one of the first pixels of the first decoded wavelength-based data group or the second pixels of the second decoded wavelength-based data group.

Clause 58. The method of clause 56 or 57, wherein the non-standardized image data processing comprises processing the at least one of the first decoded wavelength-based data group or the second decoded wavelength-based data group to detect one or more objects included in the plurality of encoded wavelength-based data groups.

Clause 59. The method of clause 58, wherein processing the at least one of the first decoded wavelength-based data group or the second decoded wavelength-based data group comprises processing the at least one of the first decoded wavelength-based data group or the second decoded wavelength-based data group using an artificial intelligence model.

Clause 60. The method of clause 59, wherein the artificial intelligence model comprises one or more of a machine learning model, a multilayer perception (MLP) model, a neural network model, a convolutional neural network (CNN) model, or a recurrent neural network (RNN) model.

Clause 61. The method of clause 59 or 60, wherein processing the at least one of the first decoded wavelength-based data group or the second decoded wavelength-based data group comprises one or more of: training the artificial intelligence model using the at least one of the first decoded wavelength-based data group or the second decoded wavelength-based data group; combining the at least one of the first decoded wavelength-based data group or the second decoded wavelength-based data group with one or more image data groups obtained from another sensor; or storing the at least one of the first decoded wavelength-based data group or the second decoded wavelength-based data group in a memory.

Clause 62. The method of any of clauses 56-61, wherein a third group of pixels of the plurality of groups of pixels comprises pixels associated with a third filter, the method further comprising: obtaining, by the at least one processor, a third encoded wavelength-based data group; and decoding, with the at least one processor, the third encoded wavelength-based data group to generate a third decoded wavelength-based data group, the third decoded wavelength-based data group comprising third pixels corresponding to the third group of pixels.

Clause 63. The method of clause 62, wherein the first filter is red, the second filter is green, and the third filter is blue.

Clause 64. The method of clause 62, wherein the first filter is red, the second filter is yellow or clear, and the third filter is blue.

Clause 65. The method of clause 62, wherein the third filter is an infrared filter.

Clause 66. The method of clause 62 or 65, wherein decoding the first encoded wavelength-based data group and the second encoded wavelength-based data group comprises decoding the first encoded wavelength-based data group and the second encoded wavelength-based data group using a decoder and decoding the third encoded wavelength-based data group comprises decoding the third encoded wavelength-based data group using a different decoder.

Clause 67. The method of clause 66, wherein a combined data size of the first encoded wavelength-based data group and the second encoded wavelength-based data group is different from a data size of the third encoded wavelength-based data group.

Clause 68. The method of clause 67, wherein the data size of the third encoded wavelength-based data group is smaller than the combined data size of the first encoded wavelength-based data group and the second encoded wavelength-based data group.

Clause 69. The method of any of clauses 66-68, further comprising: processing, with the at least one processor, the third decoded wavelength-based data group, for the non-standardized image data processing, without changing a dimension of the third pixels of the third decoded wavelength-based data group.

Clause 70. The method of any of clauses 62 and 65-69, wherein a height and a width of the third pixels of the third decoded wavelength-based data group is the same as a height and a width of at least one of the first decoded wavelength-based data group or the second decoded wavelength-based data group.

Clause 71. The method of any of clauses 62 and 65-70, further comprising: combining the third decoded wavelength-based data group with the first decoded wavelength-based data group and the second decoded wavelength-based data group to generate a combined decoded wavelength-based data group; and processing the combined decoded wavelength-based data group, for the non-standardized image data processing, without changing a size of pixels of the combined decoded wavelength-based data group.

Clause 72. The method of any of clauses 62-64, wherein the second encoded wavelength-based data group comprises an average pixel dataset calculated based on at least one pixel of the second group of pixels and at least one pixel of the third group of pixels, and wherein decoding the first encoded wavelength-based data group and the second encoded wavelength-based data group comprises decoding the first encoded wavelength-based data group and the average pixel dataset of the second encoded wavelength-based data group with a same decoder.

Clause 73. The method of clause 72, wherein processing the at least one of the first decoded wavelength-based data group or the second decoded wavelength-based data group comprises processing the average pixel dataset of the second decoded wavelength-based data group, for the non-standardized image data processing, without changing a dimension of pixels of the average pixel dataset of the second decoded wavelength-based data group.

Clause 74. The method of clause 72 or 73, wherein processing the at least one of the first decoded wavelength-based data group or the second decoded wavelength-based data group comprises processing the average pixel dataset of the second decoded wavelength-based data group without converting the average pixel dataset into a standardized wavelength-based data group.

Clause 75. The method any of clauses 62-64, wherein the third encoded wavelength-based data group comprises a comparative image dataset generated based on differences between pixels of the second group of pixels and pixels of the third group of pixels, and wherein decoding the first encoded wavelength-based data group and the second encoded wavelength-based data group comprises decoding the first encoded wavelength-based data group and the second encoded wavelength-based data group using a decoder and decoding the third encoded wavelength-based data group comprises decoding the comparative image dataset of the third encoded wavelength-based data group using a different decoder.

Clause 76. The method of clause 74 or 75, wherein a height and a width of the comparative image dataset of the third decoded wavelength-based data group is the same as a height and a width of at least one of the first decoded wavelength-based data group or the second decoded wavelength-based data group.

Clause 77. The method of any of clauses 74-76, further comprising: combining the third decoded wavelength-based data group with the first decoded wavelength-based data group and the second decoded wavelength-based data group to generate a combined decoded wavelength-based data group; and processing the combined decoded wavelength-based data group, for the non-standardized image data processing, without changing a size of pixels of the combined decoded wavelength-based data group.

Clause 78. The method of clause 77, wherein a height and a width of the combined decoded wavelength-based data group is the same as a height and a width of at least one of the first decoded wavelength-based data group or the second decoded wavelength-based data group.

Clause 79. The method of any of clauses 74-78, wherein the second decoded wavelength-based data group comprises a first single-color pixel dataset calculated based on one of the second group of pixels or the third group of pixels.

Clause 80. The method of clause 79, further comprising recreating a second single-color pixel dataset corresponding to the other one of the second group of pixels or the third group of pixels based on the comparative image dataset and the first single color pixel dataset.

Clause 81. The method of any of clauses 74-80, wherein a height and a width of the first single-color pixel dataset of the second decoded wavelength-based data group is the same as a height and a width of the second single-color pixel dataset.

Clause 82. The method of any of clauses 56-81, wherein decoding the first encoded wavelength-based data group and the second encoded wavelength-based data group comprises: decoding the first pixels of the first encoded wavelength-based data group and the second pixels of the second encoded wavelength-based data group to respectively generate first decoded pixels and second decoded pixels; and converting values of the first decoded pixels and values of the second decoded pixels from a first format to a second format.

Clause 83. The method of any of clauses 56-82, wherein the first decoded wavelength-based data group and the second decoded wavelength-based data group are not human perceptible.

Clause 84. The method of any of clauses 56-83, wherein neither of the first decoded wavelength-based data group and the second decoded wavelength-based data group is converted into a standardized wavelength-based data group.

Clause 85. A system, comprising: a data store storing computer-executable instructions; and a processor configured to: obtain a plurality of encoded wavelength-based data groups comprising a first encoded wavelength-based data group and a second encoded wavelength-based data group, the plurality of encoded wavelength-based data groups being associated with a plurality of groups of pixels; decode the first encoded wavelength-based data group and the second encoded wavelength-based data group to respectively generate a first decoded wavelength-based data group and a second decoded wavelength-based data group, the first decoded wavelength-based data group comprising first pixels corresponding to a first group of pixels of the plurality of groups of pixels, the first group of pixels associated with a first filter, the second decoded wavelength-based data group comprising second pixels corresponding to a second group of pixels of the plurality of groups of pixels, the second group of pixels associated with a second filter; and communicate at least one of the first decoded wavelength-based data group or the second decoded wavelength-based data group, for non-standardized image data processing associated with an autonomous vehicle.

Clause 86. Non-transitory computer-readable media comprising computer-executable instructions that, when executed by a computing system, causes the computing system to: obtain a plurality of encoded wavelength-based data groups comprising a first encoded wavelength-based data group and a second encoded wavelength-based data group, the plurality of encoded wavelength-based data groups being associated with a plurality of groups of pixels; decode the first encoded wavelength-based data group and the second encoded wavelength-based data group to respectively generate a first decoded wavelength-based data group and a second decoded wavelength-based data group comprising first pixels corresponding to a first group of pixels of the plurality of groups of pixels, the first group of pixels associated with a first filter, the second decoded wavelength-based data group comprising second pixels corresponding to a second group of pixels of the plurality of groups of pixels, the second group of pixels associated with a second filter; and communicate at least one of the first decoded wavelength-based data group or the second decoded wavelength-based data group, for non-standardized image data processing associated with an autonomous vehicle.

ADDITIONAL EXAMPLES

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
receiving, by at least one processor, raw image data associated with an image sensor, wherein the raw image data comprises a plurality of groups of pixels, wherein a first group of pixels of the plurality of groups of pixels comprises pixels associated with a first filter, a second group of pixels of the plurality of groups of pixels comprises pixels associated with a second filter, and a third group of pixels of the plurality of groups of pixels comprises pixels associated with the second filter;

generating, from the raw image data, a plurality of wavelength-based data groups comprising a first wavelength-based data group and a second wavelength-based data group, the first wavelength-based data group comprising first pixels corresponding to the first group of pixels and the second wavelength-based data group comprising second pixels corresponding to the second group of pixels, wherein generating the second wavelength-based data group comprises determining a value for the second pixels of the second wavelength-based data group based on one of the second group of pixels or the third group of pixels;

encoding, with the at least one processor, the first wavelength-based data group to generate an encoded first wavelength-based data group;

encoding, with the at least one processor, the second wavelength-based data group to generate an encoded second wavelength-based data group;

determining a comparative image dataset based on differences between pixels of the second group of pixels and pixels of the third group of pixels; and encoding the comparative image dataset to generate an encoded comparative image dataset, wherein encoding the first wavelength-based data group is independent of encoding of other wavelength-based data groups of the plurality of wavelength-based data groups.

2. The method of claim 1, wherein a third group of pixels of the plurality of groups of pixels comprises pixels associated with a third filter, the method further comprising:

generating, from the raw image data, a third wavelength-based data group, the third wavelength-based data group comprising third pixels corresponding to the third group of pixels; and encoding, with the at least one processor, the third wavelength-based data group to generate an encoded third wavelength-based data group.

3. The method of claim 2, wherein the third filter is an infrared filter.

4. The method of claim 2, wherein encoding the first wavelength-based data group and encoding the second wavelength-based data group comprises encoding the first wavelength-based data group and encoding the second wavelength-based data group using a first encoder, and encoding the third wavelength-based data group comprises encoding the third wavelength-based data group using a second encoder different form the first encoder.

5. The method of claim 1, wherein the second filter is one of green, yellow or clear.

6. The method of claim 1, wherein generating the plurality of wavelength-based data groups comprises calculating a value for the second pixels of the second wavelength-based data group based on the second group of pixels and the third group of pixels.

7. The method of claim 6, wherein calculating the value for the second pixels of the second wavelength-based data group comprises calculating an average between at least one pixel of the second group of pixels and at least one pixel of the third group of pixels.

8. The method of claim 1, wherein encoding the first wavelength-based data group and encoding the second wavelength-based data group comprises encoding the first wavelength-based data group and encoding the second wavelength-based data group using a first encoder and encoding the comparative image dataset comprises encoding the comparative image dataset using a second encoder different from the first encoder.

9. The method of claims 1, wherein a fourth group of pixels of the plurality of groups of pixels comprises pixels associated with a third filter, the method further comprising:

generating, from the raw image data, a third wavelength-based data group, the third wavelength-based data group comprising third pixels corresponding to the fourth group of pixels; and encoding the third wavelength-based data group to generate a third wavelength-based data group.

10. The method of claim 9, wherein the first filter is red, the second filter is green, and the third filter is blue.

11. The method of claim 10, wherein the second group of pixels comprises green pixels on a same row as the first group of pixels, and the third group of pixels comprises green pixels on a same row as the fourth group of pixels.

12. The method of claim 9, wherein the first filter is red, the second filter is yellow, and the third filter is blue.

13. The method of claim 9, wherein the first filter is red, the second filter is clear, and the third filter is blue.

14. The method of claim 9, wherein encoding the first wavelength-based data group and encoding the second wavelength-based data group comprises encoding the first wavelength-based data group and encoding the second wavelength-based data group using a first encoder and encoding the third wavelength-based data group comprises encoding the third wavelength-based data group using a second encoder different from the first encoder.

15. The method of claim 9, wherein a fifth group of pixels of the plurality of groups of pixels comprises pixels associated with a fourth filter, the method further comprising:

generating, from the raw image data, a fourth wavelength-based data group, the fourth wavelength-based data group comprising fourth pixels corresponding to the fifth group of pixels; and encoding the fourth wavelength-based data group to generate an encoded fourth wavelength-based data group.

16. The method of claim 9, wherein the third filter is an infrared filter.

17. The method of claim 1, wherein encoding the first wavelength-based data group and encoding the second wavelength-based data group comprises:

converting values of the first pixels and the second pixels from a first format to a second format;

encoding the converted values of the first pixels to generate the encoded first wavelength-based data group; and encoding the converted values of the second pixels to generate the encoded second wavelength-based data group.

18. The method of claim 1, wherein each of the first pixels of the first wavelength-based data group correspond to a first color and each of the second pixels of the second wavelength-based data group correspond to a second color.

19. The method of claim 1, wherein generating the first wavelength-based data group and the second wavelength-based data group comprises assigning the first group of pixels to the first wavelength-based data group and the second group of pixels to the second wavelength-based data group.

20. The method of claim 1, wherein a height of the first wavelength-based data group and a height of the second wavelength-based data group is half a height of the raw image data, and wherein a width of the first wavelength-based data group and a width of the second wavelength-based data group is half a width of the raw image data.

21. A system, comprising:

a data store storing computer-executable instructions; and a processor configured to:

receive raw image data associated with an image sensor, wherein the raw image data comprises a plurality of groups of pixels, wherein a first group of pixels of the plurality of groups of pixels comprises pixels associated with a first filter, a second group of pixels of the plurality of groups of pixels comprises pixels associated with a second filter, and a third group of pixels of the plurality of groups of pixels comprises pixels associated with the second filter;

generate, from the raw image data, a plurality of wavelength-based data groups comprising a first wavelength-based data group and a second wavelength-based data group, the first wavelength-based data group comprising first pixels corresponding to the first group of pixels and the second wavelength-based data group comprising second pixels corresponding to the second group of pixels, wherein generating the second wavelength-based data group comprises determining a value for the second pixels of the second wavelength-based data group based on one of the second group of pixels or the third group of pixels;

encode the first wavelength-based data group to generate an encoded first wavelength-based data group;

encode the second wavelength-based data group to generate an encoded second wavelength-based data group;

determine a comparative image dataset based on differences between pixels of the second group of pixels and pixels of the third group of pixels; and encode the comparative image dataset to generate an encoded comparative image dataset, wherein encoding the first wavelength-based data group is independent of encoding of other wavelength-based data groups of the plurality of wavelength-based data groups.

22. Non-transitory computer-readable media comprising computer-executable instructions that, when executed by a computing system, causes the computing system to:

receive raw image data associated with an image sensor, wherein the raw image data comprises a plurality of groups of pixels, wherein a first group of pixels of the plurality of groups of pixels comprises pixels associated with a first filter, a second group of pixels of the plurality of groups of pixels comprises pixels associated with a second filter, and a third group of pixels of the plurality of groups of pixels comprises pixels associated with the second filter;

generate, from the raw image data, a plurality of wavelength-based data groups comprising a first wavelength-based data group and a second wavelength-based data group, the first wavelength-based data group comprising first pixels corresponding to the first group of pixels and the second wavelength-based data group comprising second pixels corresponding to the second group of pixels, wherein generating the second wavelength-based data group comprises determining a value for the second pixels of the second wavelength-based data group based on one of the second group of pixels or the third group of pixels;

encode the first wavelength-based data group to generate an encoded first wavelength-based data group;

encode the second wavelength-based data group to generate an encoded second wavelength-based data group;

determine a comparative image dataset based on differences between pixels of the second group of pixels and pixels of the third group of pixels; and encode the comparative image dataset to generate an encoded comparative image dataset, wherein encoding the first wavelength-based data group is independent of encoding of other wavelength-based data groups of the plurality of wavelength-based data groups.

* * * * *